US009409823B2

(12) United States Patent
Chung et al.

(10) Patent No.: US 9,409,823 B2
(45) Date of Patent: Aug. 9, 2016

(54) MICROSTRUCTURED HIGH-TEMPERATURE HYBRID MATERIAL, ITS COMPOSITE MATERIAL AND METHOD OF MAKING

(71) Applicants: Deborah Duen Ling Chung, East Amherst, NY (US); Xiaoqin Gao, Amherst, NY (US)

(72) Inventors: Deborah Duen Ling Chung, East Amherst, NY (US); Xiaoqin Gao, Amherst, NY (US)

(73) Assignee: Deborah D. L. Chung, E. Amherst, NY (US)

( * ) Notice: Subject to any disclaimer, the term of this patent is extended or adjusted under 35 U.S.C. 154(b) by 758 days.

(21) Appl. No.: 13/769,278

(22) Filed: Feb. 15, 2013

(65) Prior Publication Data

US 2015/0376064 A1    Dec. 31, 2015

(51) Int. Cl.
 C04B 35/00 (2006.01)
 C04B 33/32 (2006.01)
 C04B 35/628 (2006.01)
 C04B 35/645 (2006.01)
 C04B 35/83 (2006.01)

(52) U.S. Cl.
 CPC ......... *C04B 33/326* (2013.01); *C04B 35/62849* (2013.01); *C04B 35/645* (2013.01); *C04B 35/83* (2013.01); *C04B 2235/3201* (2013.01); *C04B 2235/349* (2013.01); *C04B 2235/422* (2013.01); *C04B 2235/5248* (2013.01); *C04B 2235/5264* (2013.01); *C04B 2235/6562* (2013.01); *C04B 2235/6567* (2013.01); *C04B 2235/661* (2013.01); *C04B 2235/77* (2013.01); *C04B 2235/80* (2013.01); *C04B 2235/96* (2013.01)

(58) Field of Classification Search
 CPC ........ C04B 35/71; C04B 35/78; C04B 35/80; C04B 35/803; C04B 35/806; C04B 35/83
 USPC ............................................... 501/95.1, 95.2
 See application file for complete search history.

(56) References Cited

U.S. PATENT DOCUMENTS

| 4,668,579 A | 5/1987 | Keiser |
| 4,863,773 A | 9/1989 | Rousseau |
| 4,894,286 A | 1/1990 | Gray |
| 4,935,387 A * | 6/1990 | Beall ............... C03C 14/002 428/698 |
| 4,937,101 A | 6/1990 | Gray |
| 5,225,283 A | 7/1993 | Weyneth |

(Continued)

OTHER PUBLICATIONS

Stinton et al. Matrix characterization of fibre-reinforced SiC matrix composites fabricated by chemical vapour infiltration. Journal of Material Science, 30 (1995) 4279 4285.*

*Primary Examiner* — Noah Wiese

(57) ABSTRACT

This invention provides a hybrid material that exhibits strength, stiffness and ability to resist high temperatures. This hybrid material essentially consists of component A and component B. Component A is selected from the group consisting of inorganic compounds, oxides, carbides, nitrides, borides, and combinations thereof. Component B is selected from the group comprising elemental carbon, inorganic compounds, oxides, carbides, nitrides, borides, and combinations thereof. Component B comprises a plurality of units, each of the units substantially exhibiting a shape, such that this shape substantially exhibits a long dimension and a short dimension, with the short dimension being in a direction that is essentially perpendicular to the direction of the long dimension and the short dimension being in the range from 0.1 nm to 0.5 μm. Each of the units of component B is substantially in contact with and substantially bonded to at least one of the units of component A.

20 Claims, 5 Drawing Sheets

(56) References Cited

U.S. PATENT DOCUMENTS

| | | |
|---|---|---|
| 5,254,397 A | 10/1993 | Kawai |
| 5,294,387 A | 3/1994 | Oshima |
| 5,376,598 A | 12/1994 | Simpson |
| 5,380,556 A * | 1/1995 | Hocquellet ............. C04B 35/83 |
| | | 264/29.1 |
| 5,427,823 A | 6/1995 | Brown, Jr. |
| 5,552,505 A | 9/1996 | Keller |
| 5,587,345 A | 12/1996 | Leung |
| 5,635,300 A | 6/1997 | Kostikov |
| 5,955,197 A | 9/1999 | Skowronski |
| 6,051,313 A | 4/2000 | Coupe |
| 6,221,475 B1 | 4/2001 | Domergue |
| 6,261,692 B1 | 7/2001 | Cho |
| 6,514,562 B1 | 2/2003 | Faria |
| 6,610,770 B1 | 8/2003 | Kaizerman |
| 6,668,984 B2 | 12/2003 | Gray |
| 6,887,569 B1 | 5/2005 | Lee |
| 7,160,618 B2 | 1/2007 | Walker |
| 7,211,208 B2 | 5/2007 | Snyder |
| 7,276,166 B2 * | 10/2007 | Koslow ................. A61L 2/0017 |
| | | 210/490 |
| 7,297,368 B2 | 11/2007 | Williams |
| 7,407,901 B2 | 8/2008 | Bystricky |
| 7,575,799 B2 | 8/2009 | Fryska |
| 7,928,156 B2 | 4/2011 | Berzinis |
| 8,231,703 B1 * | 7/2012 | Seals ....................... C22C 47/08 |
| | | 75/243 |
| 2005/0059765 A1 | 3/2005 | Jackson |
| 2006/0276579 A1 | 12/2006 | Cicerchi |
| 2007/0032585 A1 | 2/2007 | Zhu |
| 2008/0090064 A1 | 4/2008 | James |
| 2010/0205929 A1 | 8/2010 | Gajiwala |
| 2010/0292069 A1 | 11/2010 | Ichikawa |
| 2010/0331166 A1 | 12/2010 | Hidaka |
| 2012/0308813 A1 * | 12/2012 | Hoelscher ............... C04B 28/18 |
| | | 428/338 |

* cited by examiner

MICROSTRUCTURED HIGH-TEMPERATURE HYBRID MATERIAL, ITS COMPOSITE MATERIAL AND METHOD OF MAKING

FIELD OF THE INVENTION

This invention relates to the field of hybrid materials.

BACKGROUND OF THE INVENTION

Hybrid materials refer to artificial combinations of constituents that differ in structure and/or composition. The combination results in properties that none of the individual constituents can provide. The structure and composition within each constituent, the degree of bonding between the constituents, the relative positions of the units of the constituents in the hybrid material, and the shape and size of each unit of the constituent in the hybrid material are all important in governing the properties of the hybrid material. An example of a hybrid material is one that consists of two constituents that are bonded together within each unit of the hybrid material, with each constituent comprising a plurality of units, such that each unit is in the form of a sheet. In an example of the relative positions of the units of the constituents, the sheets of the two constituents are regularly alternating.

Hybrid materials are particularly attractive when the size of each unit of a constituent is small (e.g., less than 10 μm, preferably less than 1 μm). This is because the small constituent unit size and the consequent large area of the interface between adjoining constituent units enhance the extent of interaction between the adjoining constituents. For example, such interaction may cause the structure of one constituent to affect that of an adjoining constituent, as in the case of an epitaxial thin film on a crystalline substrate, with the structure of the thin film affected by the structure of the substrate, such that the thin film is crystallographically in registry with the substrate. This interaction provides an avenue for controlling or tailoring the structure of a material. Furthermore, the small constituent size allows the hybrid material unit size to be small while the hybrid material remains representative of the structure of the hybrid. The ability for the hybrid material to be small in unit size widens the scope of applications for the hybrid material. An example of an application that benefits from a small hybrid material unit size is the use of the hybrid material as a filler in a composite material.

A challenge in the development of hybrid materials relates to the imperfect bonding between the constituents of the hybrid material. The imperfect bonding results in weakness at the interface between the adjoining constituents. The smaller is the constituent unit size, the larger is the amount of the interface area per unit volume, and the more severe is the problem associated with the weak interface.

A composite material is an artificial combination of components that are different in structure and/or composition, such that the composite material involves solid ingredients that are bound by a binder, which forms the matrix of the composite material. There are various types of solid ingredients, including continuous fibers, short fibers, tubes, particles, platelets, sheets, etc. A filler is a solid ingredient that is discontinuous and small in size, most commonly in the form of particles.

Because the desired properties of a composite material tend to be enhanced by an increase in the volume fraction of a solid ingredient, the volume fraction of the matrix should be kept low. For example, the elastic modulus of a composite with fiber reinforcement increases with increasing reinforcement volume fraction. Thus, the binder or matrix needs to be effective for binding the solid ingredients together even when it is at a low volume fraction. This requirement on the binder or matrix poses a challenge for the development of composite materials.

Another challenge in the development of composite materials relates to the imperfect binding of the solid ingredients of the composite material. The imperfect binding results in weakness at the interface between the units of a solid ingredient and the matrix of the composite. The smaller is the size of each unit of the solid ingredient, the larger tends to be the amount of the interface area per unit volume, and the more severe tends to be the problem associated with the weak interface.

High-temperature materials are materials that can resist high temperatures, such as temperatures above 1000° C. Preferably they can resist high temperatures in the presence of oxygen, which is in air. They are needed for numerous applications, such as missiles, reentry space vehicles, aircraft brakes, furnace components, power plant components and high-temperature industrial process components. For missiles, reentry space vehicles and aircraft brakes, the materials also need to be low in density, i.e., lightweight, for the purpose of fuel saving.

Ceramics are inorganic compounds such as oxides, carbides, nitrides, sulfides, silicates, oxynitrides, oxycarbides, etc. Because they are compounds (having already undergone reactions that result in these compounds), they tend to be thermally more stable than elemental carbon, metals and polymers. Therefore, high-temperature materials are commonly in the form of ceramics, which tend to be able to resist high temperatures even in the presence of oxygen.

Another class of high-temperature materials is elemental carbon in the graphite family, i.e., elemental carbon (not necessarily pure carbon) that substantially exhibits $sp^2$ hybridization in each carbon atom. Graphite (such as natural graphite flakes) is crystalline, with a crystal structure that consists of graphite layers that are stacked in the AB sequence, with a combination of covalent bonding and metallic bonding within each layer and weak secondary bonding (van der Waals force) between the layers. In contrast to graphite, elemental carbon in the graphite family may or may not be crystalline. In case that the elemental carbon in the graphite family is not crystalline, the carbon still consists of layers that exhibit a combination of covalent bonding and metallic bonding within each layer, but the layers are limited in area and are not well ordered. Because the crystalline form is thermodynamically stable, whereas the noncrystalline form is only metastable, noncrystalline carbon can be converted to graphite by heating at a sufficiently high temperature that is known as the heat-treatment temperature. The higher is the heat-treatment temperature, the greater is the degree of crystallinity. This crystallization process is known as graphitization. Carbon fibers, carbon nanofibers, carbon nanotubes, graphene, graphite flakes, graphite nanoplatelets, intercalated graphite, exfoliated graphite, carbon black and activated carbon are examples of elemental carbon in the graphite family. In particular, carbon fibers are commonly noncrystalline, although carbon fibers that exhibit a degree of crystallinity exist. On the other hand, diamond is elemental carbon that is not in the graphite family. Both diamond and diamond-like carbon exhibit $sp^3$ hybridization of the carbon atoms. Diamond is not a high-temperature material, because it changes to elemental carbon in the graphite family at high temperatures. Graphite is the thermodynamically stable form of elemental carbon at room temperature and pressure.

Although elemental carbon in the graphite family is a high-temperature material, it suffers from the tendency to be oxidized at high temperatures in the presence of oxygen, such that the carbon forms carbonaceous gases, such as carbon dioxide. As a consequence of the oxidation, the elemental carbon experiences mass loss, which is undesirable.

Due to the superior oxidation resistance of ceramics compared to carbons, the oxidation resistance of a carbon material is commonly enhanced by coating the carbon material with a ceramic material (such as silicon carbide). However, the coating tends to suffer from the tendency to be detached, due to the high-temperature use and the difference in thermal expansion coefficient between the coating material and the carbon material. Furthermore, the coating process adds to the cost of material production. In addition, due to the low thermal conductivity and low electrical conductivity of typical ceramic materials compared to elemental carbon materials, the ceramic coating is undesirable for applications that require heat dissipation, lightning protection, electromagnetic interference shielding or electrical conduction.

For the purpose of improving the oxidation resistance, elemental carbon can be coated with silicon carbide (U.S. Pat. No. 5,380,556, U.S. Pat. No. 5,225,283, U.S. Pat. No. 6,668,984, U.S. Pat. No. 4,668,579, U.S. Pat. No. 5,955,197, U.S. Pat. No. 6,668,984), which is more oxidation resistant than carbon. Other coating materials are boron carbide (U.S. Pat. No. 4,668,579, U.S. Pat. No. 7,160,618), boron nitride (U.S. Pat. No. 7,160,618), silicon oxide (U.S. Pat. No. 4,894,286), boron oxide (U.S. Pat. No. 4,894,286), titanium oxide (U.S. Pat. No. 4,894,286), alkali or alkaline earth metal silicates (U.S. Pat. No. 7,160,618), alkali metal hydroxide (U.S. Pat. No. 7,160,618), glass (U.S. Pat. No. 5,955,197) and glass-ceramic (U.S. Pat. No. 5,955,197, U.S. Pat. No. 5,427,823).

Both ceramic materials and elemental carbon materials are typically brittle compared to metals. In order to reduce the brittleness of these materials, fiber reinforcement is commonly added, thus resulting in fiber-reinforced ceramic materials (i.e., fibrous ceramic-matrix composite materials) and fiber-reinforced carbon materials (i.e., fibrous carbon-matrix composite materials). The fiber reinforcement also serves to enhance the strength and stiffness (modulus of elasticity). The fibers tend to be more effective when they are continuous rather than being discontinuous. Due to the high-temperature use of the ceramic-matrix and carbon-matrix composites, the fibers and the matrix are preferably essentially the same in composition, so that they are essentially equal in the thermal expansion coefficient. Hence, the fibers in a ceramic-matrix composite are preferably ceramic fibers and the fibers in a carbon-matrix composite are preferably carbon fibers. A ceramic-fiber ceramic-matrix composite (e.g., a silicon-carbide-fiber silicon-carbide-matrix composite) is also known as a ceramic-ceramic composite. A carbon-fiber carbon-matrix composite is also known as a carbon-carbon composite.

Due to the extremely high melting temperatures of ceramics and carbons, the fabrication of shaped articles made of ceramics or carbons does not involve melting. A method of fabrication involves sintering (U.S. Pat. No. 5,294,387), which is heating without melting, such that the heating provides sufficient thermal energy for the atoms to move in the solid state. For example, in case that the ceramic or carbon is in the form of particles, the atomic movement enables connection resembling a neck to be formed between the particles, thereby resulting in bonding. However, the temperature required for sintering is still very high. Furthermore, sintering is expensive and restrictive in the size of the resulting article, due to the high temperatures and pressures involved. However, sintering allows a wide choice of ceramic compositions, e.g., mullite (U.S. Pat. No. 5,294,387, U.S. Pat. No. 5,376,598), alumina (U.S. Pat. No. 6,887,569), and zirconia (U.S. Pat. No. 6,887,569).

Yet another method of fabrication involves the use of a precursor material, which upon heating, undergoes thermochemical decomposition, thermal transformation and/or chemical reaction, thereby forming the ceramic or carbon material desired. The temperature required for this process is typically lower than that required for sintering. A ceramic precursor is a material that, upon heating, forms a ceramic material. A carbon precursor is a material that, upon heating, forms an elemental carbon material. The heating process is known as pyrolysis in case that the precursor is an organic material and the process involves thermochemical decomposition. In the case of the formation of elemental carbon from a carbon precursor, the process is also known as carbonization. The mass of the ceramic or elemental carbon that results from a unit mass of the precursor through the pyrolysis process is known as the yield of the precursor. In case of a carbon precursor, the yield is known as the carbon yield. A high yield is preferred, since the porosity in the resulting carbon increases with decreasing carbon yield of the carbon precursor. The precursors are commonly in a liquid form (e.g., a resin). The ceramic precursor has a composition that includes the atoms of the elements that constitute the resulting ceramic. For example, a polymer that contains silicon and carbon atoms (e.g., polycarbosilane) can serve as a precursor for silicon carbide; a polymer that contains carbon atoms (e.g., pitch) can serve as a precursor for elemental carbon. The liquid form of the precursor is attractive in that it allows convenient shaping of the final product and also allows conformability with the surface topography of the solid ingredients present. In order to avoid oxidation, the heating is commonly performed in the essential absence of oxygen. This is particularly important for the heating of a carbon precursor to form carbon. Examples of inert atmospheres are nitrogen gas, argon gas and vacuum.

The method of fabrication involving precursors is particularly common in the fabrication of ceramic-matrix and carbon-matrix composites. The precursor serves as the binder for the solid ingredients (such as fibers) and forms the matrix of the resulting composite material during the heating associated with the fabrication of the composite material. Hence, the precursor is often known as the matrix precursor. In the fabrication of a ceramic-ceramic composite, ceramic fibers and a ceramic precursor are used together, such that the ceramic precursor binds the ceramic fibers together and forms the ceramic matrix of the resulting composite. In the fabrication of a carbon-carbon composite, carbon fibers and a carbon precursor are used together, such that the carbon precursor binds the carbon fibers together and forms the carbon matrix of the resulting composite.

A shortcoming of the precursor method is the porosity in the resulting ceramic or carbon material. The porosity is a consequence of the fact that the volume of the resulting ceramic or carbon material is smaller than the volume of the precursor material, due to the fact that the yield of the precursor is less than 1 (due to the partial loss of the precursor material as gases during the fabrication). Pores are detrimental to the mechanical properties and numerous other properties of the resulting ceramic or carbon material. Therefore, the pyrolysis process is commonly followed by densification, which is a process aimed at decreasing the porosity. The densification process commonly involves impregnation of the pores with the precursor and subsequent pyrolysis of the newly impregnated precursor. As porosity still occurs after the second round of pyrolysis, multiple cycles (e.g., more than six cycles) of impregnation and pyrolysis are commonly necessary in order to attain an adequate degree of densification. Another method of densification involves chemical vapor infiltration (abbreviated CVI), which is a process that involves the infiltration of a precursor gas into the pores, followed by heating to form the ceramic or elemental carbon. CVI is commonly used as a final step of densification, since the pores become smaller as the material becomes more densified and a precursor gas can penetrate the small pores more easily that a precursor liquid. The densification process is tedious and costly and contributes significantly to the high cost of ceramic-matrix and carbon-matrix composites.

A method of facilitating the densification process involves the addition of a filler in the form of a ceramic powder that can resist high temperatures, such as aluminum oxide, boron carbide, silicon carbide, titanium carbide, molybdenum silicide, titanium silicide and silicon germanide (U.S. Pat. No. 7,211,208, U.S. Pat. No. 7,575,799, U.S. Pat. No. 6,261,692). However, this method does not provide enough positive effects on the mechanical properties.

Ceramic-matrix composites tend to be superior in the ability to resist high temperatures than carbon-matrix composites. However, they tend to be more difficult to fabricate than carbon-matrix composites, due to the greater complexity of the chemical/thermal process associated with the conversion of a ceramic precursor to a ceramic compared with the process associated with the conversion of a carbon precursor to elemental carbon.

Due to the superior thermal stability of ceramics compared to carbon, ceramic-carbon hybrids have been used, mostly commonly as the matrix of a composite material. For example, a ceramic precursor (such as a polycarbosilane, which is a precursor for silicon carbide) and a carbon precursor (such as pitch) are mixed in the liquid state and converted by heating to a multi-phase material that comprises the ceramic that is formed from the ceramic precursor and the elemental carbon that is formed from the carbon precursor (U.S. Pat. No. 5,254,397, U.S. Pat. No. 6,221,475). The phases in the multi-phase material are randomly and homogeneously distributed and are intermixed in a fine scale, since they are formed from ceramic and carbon precursors that are randomly and homogeneously distributed and are finely mixed. In other words, there is no control of the configuration of the spatial distribution of the phases in the multi-phase material. This means that there is no control of the shape of the units of each phase in the multi-phase material. Furthermore, this method limits the choice of the ceramic phase in the multi-phase material to those that can be formed by processing ceramic precursors that are in a liquid form. In particular, ceramic alloys such as mullite (which exhibits an attractively high melting temperature) cannot be obtained by using this method.

In a related but different method, a ceramic-carbon hybrid is formed by the pyrolysis of a suitable copolymer (U.S. Pat. No. 5,552,505). However, this method also suffers from the difficulty of forming specific ceramic alloys and the difficulty of controlling the configuration of the hybrid.

A ceramic-carbon hybrid can also be in the form of a carbon-carbon composite with a silicon carbide particles dispersed in the matrix (U.S. Pat. No. 4,863,773). This form of ceramic-carbon hybrid is limited to the configuration in which the ceramic is in particle form, such that the particles are dispersed in carbon and are bound by the carbon.

A ceramic-carbon hybrid can also be in the form of a ceramic-matrix composite with carbon fibers as a reinforcement embedded in the composite. An example is a carbon fiber composite with silicon carbide as the ceramic matrix (US 2010/0331166, U.S. Pat. No. 5,635,300). Another example is a carbon fiber composite with silicon oxycarbide as the ceramic matrix (U.S. Pat. No. 5,587,345). This form of ceramic-carbon hybrid is limited to the configuration in which the ceramic component is the matrix (binder) and the carbon component is the carbon fiber reinforcement.

A ceramic-carbon hybrid can also be in the form of a ceramic-matrix composite with a carbon-carbon composite embedded in the composite (U.S. Pat. No. 7,297,368). This form of ceramic-carbon hybrid is limited to the configuration in which the ceramic component is the matrix (binder) and the carbon component is the carbon-carbon composite.

A ceramic-carbon hybrid can also be in the form of a composite with a combination of ceramic fibers and carbon fibers, such as a yarn comprising the ceramic fibers and carbon fibers (U.S. Pat. No. 6,051,313). In the final product, this hybrid is used as the reinforcement in a composite material that consists of the hybrid and a certain matrix material that binds the components of the hybrid together. This form of ceramic-carbon hybrid is limited to the configuration in which the two types of fibers are bound together by a certain matrix material, such that the fibers are substantially not in direct contact. In the absence of the matrix material, the hybrid does not exhibit adequate mechanical properties, due to the air gaps between the adjacent fibers.

Yet another form of ceramic-carbon hybrid is a calcium silicate hydrate (a material like the cement in concrete) with embedded carbon (e.g., carbon in the form of graphite particles) can be formed by adding the carbon to the hydrate before the hydrate sets, followed by the setting and curing of the hydrate (US 2012/0308813). The resulting hybrid is a composite with the calcium silicate hydrate as the matrix and with the carbon as the filler. This method suffers from the fact that the ceramic in the hybrid is limited to silicate hydrates, which, partly due to their porosity (as in cement), tend to be inferior to conventional ceramics (such as alumina, silicon carbide, silicon dioxide and mullite) in the mechanical properties.

In order to avoid degradation of the reinforcement during the process of forming a ceramic-matrix or carbon-matrix composite, the reinforcement should be able to withstand the temperatures of the process (typically in the range from 1,000° C. to 2,500° C.). Therefore, the choice of reinforcement is limited to reinforcement materials that can withstand high temperatures. This limitation reduces the flexibility of composite material design. Furthermore, due to the relatively high cost of reinforcements that can withstand high temperatures, this limitation adds cost to the composite material.

Wear and friction properties are important for brake applications. For the purpose of improving these properties of carbon-carbon composites, ceramic powder such as silica and silicon carbide can be introduced to the composite during composite fabrication (US 2008/0090064). A related method involves the formation of a silicon carbide phase in the composite during composite fabrication (U.S. Pat. No. 6,221,475). A still related method involves the introduction of a carbide-forming metal during composite fabrication (U.S. Pat. No. 6,514,562, US 2010/0292069). However, this method does not provide adequate positive effects on the mechanical properties and does not facilitate the densification process.

For the purpose of improving the impact resistance of a carbon-carbon composite, carbon nanotubes can be introduced to the matrix of the composite (U.S. Pat. No. 7,407,901). Carbon nanotubes are advantageous due to their small diameter. The diameter is typically much smaller than the size of ceramic particles. Due to the small diameter and filamentous shape of carbon nanotubes, the area of the interface between the carbon nanotube and the carbon matrix per unit volume of the composite is substantial. Slippage at this interface provides a mechanism of consuming the mechanical energy. Thus, the substantial interfacial area results in improved impact resistance. However, the filamentous shape of a carbon nanotube is not optimum for providing a large interfacial area. For example, a planar shape would provide a larger interfacial area per unit volume than a fiber shape. In addition, carbon nanotube is very expensive compared to ceramic particles. Furthermore, this method does not facilitate the densification process.

For the purpose of improving the oxidation resistance of carbon-carbon composites, boron compounds can be introduced during composite fabrication (U.S. Pat. No. 4,937, 101). However, this method does not provide adequate positive effects on the mechanical properties, and does not facilitate the densification process.

Clay is a layered silicate material, with the silicate layers exhibiting long-range crystal structural order. Clay is inexpensive, since it is a natural and abundant mineral.

Organoclay (also known as nanoclay) is layered silicate having organic molecules between the silicate layers. Interactions involving the organic molecules and the matrix polymer enable organoclay to be particularly suitable for use as a filler (i.e., a nanofiller) in polymer-matrix composites. The effectiveness of organoclay as a reinforcement for increasing the toughness stems from the platelet shape of the silicate, the small thickness of the platelets, and the consequent large area of the interface between the platelets and the polymer matrix per unit volume of the composite material.

Organoclay is used in polymer-matrix composites for the purpose of increasing the stiffness (US 2006/0276579, U.S. Pat. No. 7,928,156, US 2007/0032585), strength (US 2007/0032585), toughness (US 2006/0276579), heat resistance (U.S. Pat. No. 7,928,156), flame-retardant ability (U.S. Pat. No. 6,610,770) and color stability (US 2007/0197711). Organoclay is also used in combination with basalt fiber in insulating polymer-matrix composites (US 2010/0205929). In addition, organoclay is used in aqueous dispersions for enhancing the thermal shock resistance (US 2005/0059765). The polymer-matrix composites can withstand temperatures up to about 350° C. (more commonly up to 200° C.); the aqueous dispersions can withstand temperatures up to about 80° C. This means that these are not high-temperature materials. The ability to withstand high temperatures is needed for numerous applications.

The present invention is directed to overcoming these and other deficiencies in the art.

SUMMARY OF THE INVENTION

This invention provides a hybrid material that exhibits strength, stiffness and ability to resist high temperatures, said hybrid material essentially consisting of component A and component B, said component A being selected from the group consisting of inorganic compounds, oxides, carbides, nitrides, borides, and combinations thereof, said component B being selected from the group consisting of elemental carbon, inorganic compounds, oxides, carbides, nitrides, borides, and combinations thereof, said component B comprising a plurality of units, each of said units substantially exhibiting a shape, said shape substantially exhibiting a long dimension and a short dimension, said short dimension being in a direction that is essentially perpendicular to the direction of said long dimension, said short dimension being in the range from 0.1 nm to 0.5 µm, said component A comprising a plurality of units, each of said units substantially exhibiting a shape, said shape substantially exhibiting a long dimension and a short dimension, said short dimension being in a direction that is essentially perpendicular to the direction of said long dimension, said short dimension being in the range from 0.1 nm to 50 µm, each of the units of component B being substantially in contact with and substantially bonded to at least one of the units of component A, the direction of the short dimension of each of the units of component B being essentially parallel to the direction of the short dimension of an adjoining unit of component A.

In a preferred embodiment, component A amounts to more than 60% of the volume of said hybrid material.

In a preferred embodiment, the hybrid material is substantially derived from a composition comprising an organo-modified mineral, said organo-modified mineral essentially consisting of component I and component II, said component I being selected from the group consisting of minerals, silicate minerals, and combinations thereof, said component II being selected from the group consisting of organic compounds, organometallic compounds, organophosphorus compounds, organosilicon compounds, organoboron compounds, organobismuth compounds, metallocenes, and combinations thereof, said component II comprising a plurality of units, each of said units substantially exhibiting a shape, said shape substantially exhibiting a long dimension and a short dimension, said short dimension being in a direction that is essentially perpendicular to the direction of said long dimension, said short dimension being in the range from 0.1 nm to 0.5 µm, said component I comprising a plurality of units, each of said units substantially exhibiting a shape, said shape substantially exhibiting a long dimension and a short dimension, said short dimension being in a direction that is essentially perpendicular to the direction of said long dimension, said short dimension being in the range from 0.1 nm to 50 µm, each of the units of component II being substantially in contact with and substantially bonded to at least one of the units of component I, the direction of the short dimension of each of the units of component II being essentially parallel to the direction of the short dimension of an adjoining unit of component I, component B of said hybrid material being substantially derived from component I of said organo-modified mineral, and component A of said hybrid material being substantially derived from component I of said organo-modified mineral.

In a preferred embodiment, each unit of said component B substantially exhibits the shape of a sheet, and each unit of said component A substantially exhibits the shape of a sheet.

In a preferred embodiment, each unit of said component B substantially exhibits the shape of a fiber, and each unit of said component A substantially exhibits the shape of a tube, the interior of said tube being substantially filled with a unit of component B.

In a preferred embodiment, said inorganic compounds are selected from the group consisting of mullite, spinel, enstatite, cristobalite, quartz, silicon dioxide, silicon carbide, hafnium carbide, silicon oxycarbide, silicon nitride, silicon oxynitride, aluminum oxide, aluminum nitride, aluminum oxynitride, boron nitride, boron carbide, silicide, titanium boride, titanium silicide, titanium carbide, titanium nitride, tungsten carbide, zirconium carbide, silicon titanium boride, hafnium silicide, borate, boron oxide, boron carbide, zinc oxide, beryllia, ceria, thoria, zirconia, hafnium oxide, yttrium oxide, titanium dioxide, bismuth telluride, bismuth selenide, bismuth compounds, lead telluride, lead selenide, zinc telluride, zinc selenide, manganese dioxide, magnesium oxide, cordierite, sekaninaite, ordered clay, disordered clay, smectite, montmorillonite, bentonite, hectorite, kaolinite, dickite, halloysite, nacrite, palygorskite, illite, chlorite, nontronite, talc, phyllosilicate, sepiolite, zeolite, sericite, mica, orthoclase, aluminum silicate, magnesium silicate, calcium silicate, and combinations thereof.

In a preferred embodiment, said elemental carbon is selected from the group consisting of graphite, graphite nanoplatelet, turbostratic carbon, disordered carbon, glassy carbon, amorphous carbon, fullerene, graphene, chemically modified graphene, chemically modified graphite, intercalated graphite, activated carbon, and combinations thereof.

In a preferred embodiment, said hybrid material is substantially derived from a composition comprising an organo-modified mineral, said organo-modified mineral essentially consisting of component I and component II, said component I being selected from the group consisting of minerals, silicate minerals, and combinations thereof, said component II being selected from the group consisting of organic compounds, organometallic compounds, organophosphorus compounds, organosilicon compounds, organoboron compounds, organobismuth compounds, metallocenes, and combinations thereof, said organic compounds being selected from the group consisting of polymers, aromatic polymers, polymer blends, copolymers, thermosetting polymers, thermoplastic polymers, pre-polymers, monomers, cellulose, rayon, phenolic, epoxy, polyarylacetylene, polyimide, polyimidesiloxane, polyacrylonitrile, lignin, furfuryl resin, resins, hydrocarbons, carbonaceous molecules, quaternary compounds, quaternary ammonium salts, carbonaceous molecules, pitch, mesophase pitch, isotropic pitch, combinations thereof.

In a preferred embodiment, said hybrid material is substantially derived from a composition comprising an organo-modified mineral, said organo-modified mineral essentially consisting of component I and component II, said component I being selected from the group consisting of minerals, silicate minerals, and combinations thereof, said component II being selected from the group consisting of organic compounds, organometallic compounds, organophosphorus compounds, organosilicon compounds, organoboron compounds, organobismuth compounds, metallocenes, and combinations thereof, said minerals being selected from the group consisting of ordered clay, disordered clay, smectite, montmorillonite, bentonite, hectorite, kaolinite, dickite, halloysite, nacrite, palygorskite, illite, chlorite, nontronite, phyllosilicates, sepiolite, zeolite, sericite, mica, aluminum silicate, magnesium silicate, calcium silicate, tellurobismuthite, tetradymite, telluride mineral, bismuthinite, bismutite, bismite, berryite, kobellite, and combinations thereof.

This invention also provides a composite material that exhibits strength, stiffness and ability to withstand high temperatures, said composite material comprising a hybrid material and an additional solid ingredient, said hybrid material essentially consisting of component A and component B, said component A being selected from the group consisting of inorganic compounds, oxides, carbides, nitrides, borides, and combinations thereof, said component B being selected from the group comprising elemental carbon, inorganic compounds, oxides, carbides, nitrides, borides, and combinations thereof, said component B comprising a plurality of units, each of said units substantially exhibiting a shape, said shape substantially exhibiting a long dimension and a short dimension, said short dimension being in a direction that is essentially perpendicular to the direction of said long dimension, said short dimension being in the range from 0.1 nm to 0.5 µm, said component A comprising a plurality of units, each of said units substantially exhibiting a shape, said shape substantially exhibiting a long dimension and a short dimension, the direction of said short dimension being essentially perpendicular to the direction of said long dimension, said short dimension being in the range from 0.1 nm to 50 µm, each of the units of component B being substantially in contact with and substantially bonded to at least one of the units of component A, the direction of the short dimension of each of the units of component B being essentially parallel to the direction of the short dimension of an adjoining unit of component A.

The additional solid ingredient in said composite material may be chosen to serve one or more functions, such as strengthening, stiffening, toughening, vibration damping, sound absorption, thermal conductivity enhancement, thermal conductivity reduction, electrical conductivity enhancement, electrical conductivity reduction, thermoelectric power enhancement, damage sensing, strain sensing, stress sensing, electromagnetic interference shielding, low observability (Stealth), dielectric constant enhancement, dielectric constant reduction, thermal expansion coefficient enhancement, thermal expansion coefficient reduction, and adsorption (fluid purification).

In a preferred embodiment, said additional solid ingredient is selected from the group consisting of carbon fibers, silicon carbide fibers, carbide fibers, oxycarbide fibers, silicon nitride fibers, nitride fibers, oxynitride fibers, silicon dioxide fibers, quartz fibers, glass fibers, fiberglass, aluminum oxide fibers, oxide fibers, ceramic fibers, mineral fibers, carbon nanofibers, carbon nanotubes, steel fibers, metal fibers, carbon particles, graphite particles, graphite nanoplatelets, graphene particles, ceramic particles, silicon carbide particles, boron nitride particles, mullite particles, zirconia particles, beryllia particles, ceria particles, silicide particles, boride particles, aluminum oxide particles, zinc oxide particles, oxide particles, metal particles, metal alloy particles, molybdenum particles, tungsten particles, and combinations thereof.

In a preferred embodiment, said composite material comprises a carbon-carbon composite material, said carbon-carbon composite material comprising continuous carbon fibers present in an amount ranging from 40% to 65% of the volume of said composite material, a carbon matrix present in an amount ranging from 20% to 50% of the volume of said composite material, and said hybrid material present in an amount ranging from 2% to 10% of the volume of said composite material.

This invention also provides a method of making said composite material, said method comprising heating a composition comprising an organo-modified mineral and an additional solid ingredient, said heating being conducted under pressure in the essential absence of oxygen, the temperature of said heating being in the range from 400° C. to 3000° C. and preferably in the range from 800° C. to 1500° C., and said pressure being in the range from 1 MPa to 100 MPa and preferably in the range from 10 MPa to 30 MPa, said organo-modified mineral essentially consisting of component I and component II, said component I being selected from the group consisting of minerals, silicate minerals, and combinations thereof, such that component A is formed from component I during said heating, said component II being selected from the group consisting of organic compounds, organometallic compounds, organophosphorus compounds, organosilicon compounds, organoboron compounds, organobismuth compounds, metallocenes, and combinations thereof, such that component B is formed from component II during said heating.

In a preferred embodiment, said composition also comprises a matrix precursor, said matrix precursor contributing to forming the matrix of said composite material during said heating.

In a preferred embodiment, said composition also comprises a matrix precursor, said matrix precursor contributing to forming the matrix of said composite material during said heating, said matrix precursor being selected from the group consisting of organic compounds, organometallic compounds, organophosphorus compounds, organosilicon compounds, organoboron compounds, organobismuth compounds, metallocenes, and combinations thereof.

In a preferred embodiment, said additional solid ingredient is selected from the group consisting of carbon fibers, silicon carbide fibers, carbide fibers, oxycarbide fibers, silicon nitride fibers, nitride fibers, oxynitride fibers, silicon dioxide fibers, quartz fibers, glass fibers, fiberglass, aluminum oxide fibers, oxide fibers, ceramic fibers, mineral fibers, carbon nanofibers, carbon nanotubes, steel fibers, metal fibers, carbon particles, graphite particles, graphite nanoplatelets, graphene particles, ceramic particles, silicon carbide particles, boron nitride particles, mullite particles, zirconia particles, beryllia particles, ceria particles, silicide particles, boride particles, aluminum oxide particles, zinc oxide particles, oxide particles, metal particles, metal alloy particles, molybdenum particles, tungsten particles, and combinations thereof.

An example of an organo-modified mineral is an organo-modified clay, also known as organoclay.

DETAILED DESCRIPTION OF THE INVENTION

Figure 1:
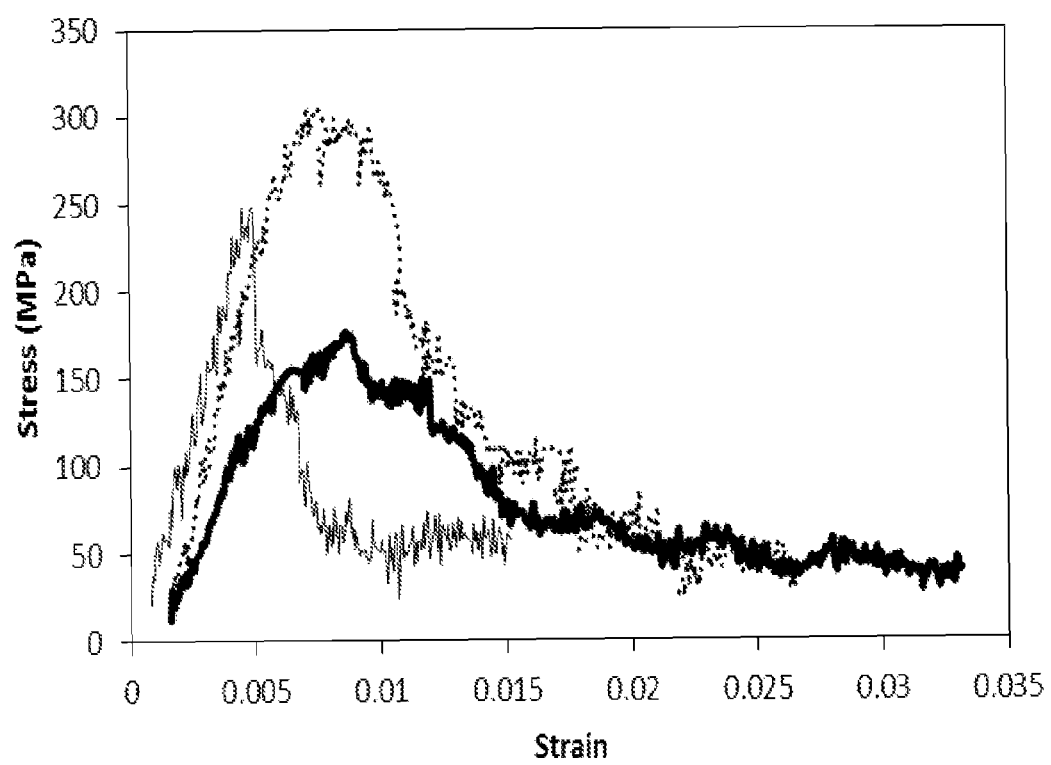
FIG. 1 shows representative flexural stress-strain curves of the C/C composites. Bold solid curve: composite without a filler or densification. Thin solid curve: composite without a filler but with densification. Dotted curve: composite with an organoclay filler but without densification.

This invention provides a microstructured high-temperature hybrid material, its composite material and a method of making the composite material. The microstructure is such that the components of the hybrid material are shaped and interposed in a microscopic scale ranging from a nanometer scale to a micrometer scale.

The hybrid material essentially consists of component A and component B. Each of components A and B comprises units. Each unit substantially exhibits a shape, which substantially exhibits a long dimension and a short dimension, such that the short dimension is in a direction that is essentially perpendicular to the direction of the long dimension. The short dimension is in the range from 0.1 nm to 0.5 μm for component B and is in the range from 0.1 nm to 50 μm for component A. Each of the units of component B is substantially in contact with and substantially bonded to at least one of the units of component A. The direction of the short dimension of each of the units of component B is essentially parallel to the direction of the short dimension of an adjoining unit of component A.

In a preferred embodiment, each unit of component A and each unit of component B substantially exhibit the shape of a sheet. The short dimension of each unit is the thickness of the sheet. The long dimension of each unit is the length of the sheet in a direction in the plane of the sheet.

In another preferred embodiment, each unit of component B substantially exhibits the shape of a fiber, and each unit of component A substantially exhibits the shape of a tube, such that the interior of the tube is substantially filled with a unit of component B. The short dimension of each unit of component B is the diameter of the fiber. The long dimension of each unit of component B is the length of the fiber along the axis of the fiber. The short dimension of each unit of component A is the outer diameter of the tube. The long dimension of each unit of component A is the length of the tube along the axis of the tube. This embodiment is advantageous in that the fiber form promotes the effectiveness of component B as a reinforcement.

In a preferred embodiment, component A amounts to more than 60% of the volume of said hybrid material.

The hybrid material has component A being the majority and component B being the minority. In case that component B comprises elemental carbon, while component A does not comprise elemental carbon, component A is better than component B in the ability to withstand high temperatures. By having component A being the majority and by having each unit of component B being substantially in contact with and substantially bonded to at least one of the units of component A, the hybrid material exhibits superior ability to withstand high temperatures than elemental carbon. In other words, the elemental carbon is protected by component A from oxidation.

The hybrid material essentially consists of component A and component B, with component A being selected from the group consisting of inorganic compounds, oxides, carbides, nitrides, borides, and combinations thereof, and component B being selected from the group comprising elemental carbon, inorganic compounds, oxides, carbides, nitrides, borides, and combinations thereof.

The hybrid material is made by heating an organo-modified mineral (such as an organoclay, which is also known as a nanoclay) under pressure in the near absence of oxygen. The organo-modified mineral essentially consists of component I and component II, with component I being selected from minerals, silicate minerals, and combinations thereof, and component II being selected from the group consisting of organic compounds, organometallic compounds, organophosphorus compounds, organosilicon compounds, organoboron compounds, organobismuth compounds, metallocenes, and combinations thereof. During the heating, the hybrid material is formed from the organo-modified mineral, such that component A of the hybrid material is formed from component I of the organo-modified mineral while component B of the hybrid material is formed from component II of the organo-modified mineral.

The shape of each unit of component B of the hybrid material is governed by the shape of each unit of component II of the organo-modified mineral. The shape of each unit of component A of the hybrid material is governed by the shape of each unit of component I of the organo-modified mineral.

The organo-modified mineral essentially consists of component I and component II. Each of components I and II comprises units. Each unit substantially exhibits a shape, which substantially exhibits a long dimension and a short dimension, such that the short dimension is in a direction that is essentially perpendicular to the direction of the long dimension. The short dimension is in the range from 0.1 nm to 0.5 µm for component I and is in the range from 0.1 nm to 50 µm for component I. Each of the units of component II is substantially in contact with and substantially bonded to at least one of the units of component I. The direction of the short dimension of each of the units of component II is essentially parallel to the direction of the short dimension of an adjoining unit of component I.

In a preferred embodiment, each unit of component I and each unit of component II substantially exhibit the shape of a sheet. The short dimension of each unit is the thickness of the sheet. The long dimension of each unit is the length of the sheet in a direction in the plane of the sheet.

In another preferred embodiment, each unit of component II substantially exhibits the shape of a fiber, and each unit of component I substantially exhibits the shape of a tube, such that the interior of the tube is substantially filled with a unit of component II. The short dimension of each unit of component II is the diameter of the fiber. The long dimension of each unit of component II is the length of the fiber along the axis of the fiber. The short dimension of each unit of component I is the outer diameter of the tube. The long dimension of each unit of component I is the length of the tube along the axis of the tube.

An example of an organo-modified mineral that involves components I and II, such that each of the two components substantially exhibits the shape of a sheet, is organo-modified montmorillonite. An example of an organo-modified mineral that involves (i) components II that substantially exhibits the shape of a fiber, and (ii) component I that substantially exhibits the shape of a tube, such that the interior of the tube is substantially filled with a unit of component II, is organo-modified halloysite.

An organo-modified mineral essentially consists of component I and component II in each piece of the organo-modified mineral. It can function as both a matrix precursor (i.e., component II, which forms the matrix upon heating) and a filler precursor (i.e., component I, which forms the filler upon heating). The processes that occur during the heating can include thermochemical decomposition, thermal transformation and/or chemical reaction. A single heating process can be used, if desired, to form the matrix from the matrix precursor and to form the filler from the filler precursor. In other words, the matrix and filler can be formed simultaneously in the same heating process, if desired. However, it is possible for distinct heating processes to be used to form the matrix and the filler. The use of a single heating process is less expensive than the use of multiple heating processes.

The matrix precursor and the filler precursor are integrated in each piece of the organo-modified mineral. This is in contrast to a conventional hybrid material in which the ingredients of the hybrid material are in distinct separate units (e.g., in cement mortar, the sand particles and the cement paste are ingredients that are in distinct separate units). The integrated structure enables the matrix formed from component II of the organo-modified mineral (i.e., component B of the hybrid material) and the filler formed from component I of the organo-modified mineral (i.e., component A of the hybrid material) to be well bonded to one another in each piece of the hybrid material that essentially consists of component A and component B. The good bonding between components A and B of the hybrid material stems from the good bonding between components I and II of the organo-modified mineral and is promoted when components A and B are formed simultaneously from components I and II of the organo-modified mineral. The good bonding occurs even when the matrix is low in volume fraction compared to the filler. The low volume fraction of the matrix (i.e., a high volume fraction of the filler) in the hybrid material is due to the low volume fraction of component II (i.e., a high volume fraction of component I) in the organo-modified mineral. In other words, the low volume fraction of the matrix is enabled by the very small unit size of the matrix, which is finely distributed in the hybrid material.

The use of the hybrid material as both a filler and a binder in a ceramic-matrix or carbon-matrix composite material enables the composite to be fabricated without the need for conducting densification after pyrolysis. This is due to the reduced pore size, which is a consequence of the small size of the filler units. The larger are the pores, the more detrimental are the pores in relation to the properties of a composite material. Due to the high cost of densification, the elimination of densification or the reduction of the need for densification results is cost saving.

The use of a filler precursor as a composite ingredient to form a filler in situ during composite fabrication (hereby referred to as the filler precursor route) differs from the conventional use of a filler (already made prior to composite fabrication) as a composite ingredient (hereby referred to as the filler route). The filler precursor route allows the formation of a large variety of fillers, including (i) those that are the same in the structure and/or composition as those that can be provided the filler route, and (ii) those that are different in the structure and/or composition from those that can be provided the filler route. Furthermore, the filler precursor tends to be low-cost compared to the filler, since it is in the form of minerals, which are naturally occurring.

The arrangement of components A and B in each piece of the hybrid material is governed by the arrangement of components I and II in each piece of the organo-modified mineral which forms the hybrid material. Thus, the arrangement is not limited to a random arrangement. An example of a non-random arrangement is one in which each unit of component A is a sheet and each unit of component B is also a sheet, such that the sheets are stacked to form an integrated piece of the hybrid material. Another example of a non-random arrangement is one in which each unit of component B is a fiber and each unit of component A is a tube, such that each tube is substantially filled with a unit of component B.

The hybrid material serves as both a filler and a binder in a composite material, which includes carbon-matrix and ceramic-matrix composites. Depending on its composition, the hybrid material can serve one or more functions, such as strengthening, stiffening, toughening, vibration damping, sound absorption, electromagnetic interference shielding, thermoelectricity production (i.e., as a thermoelectric material), thermal stability enhancement, and adsorption (i.e., as an adsorbent).

The microstructure of the organo-modified mineral provides a large interface area per unit volume between component I and component II. This large interface area, together with the small unit dimension of component II, enables the microstructure of component I to affect the microstructure of component II. For example, the atomic arrangement in component I can affect the atomic arrangement in component II. In other words, component I can act like a template for component II. The interaction between component I and component II depends on the compositions of components I and II. In case that components I and II contain ions, the interaction between components I and II can involve electrostatic forces due to the ionic interaction. The interaction between components I and II can result in the structure of component II being affected by that of component I, in addition to corroboration between (i) the conversion of component I of the organo-modified mineral to component A of the hybrid material and (ii) the conversion of component II of the organo-modified mineral to component B of the hybrid material. In particular, this corroboration results in the structure and composition of component A being affected by the presence of component II in the organo-modified mineral.

The versatility of this invention stems from the large number of choices of minerals, silicate minerals, and combinations thereof, that can be used to form component I and the large number of choices of organic compounds, organometallic compounds, organophosphorus compounds, organosilicon compounds, organoboron compounds, organobismuth compounds, metallocenes, and combinations thereof that can be used to form component II. The choice of the composition of component I influences the composition of component A in the resulting hybrid material, while the choice of the composition of component H influences the composition of component B in the resulting hybrid material. Furthermore, due to the interaction between components I and II of the organo-modified mineral, both the composition of component I and the composition of component II contribute to influencing both the composition of component A and the composition of component B in the resulting hybrid material.

For obtaining a hybrid material with component B comprising elemental carbon (which is attractive for its electrical conductivity, high effectiveness as a binder and ability to withstand high temperatures in the absence of oxygen), component II of the organo-modified mineral should comprise an appropriate form of an organic compound, which, upon heating, pyrolyses (carbonizes), thereby forming elemental carbon. For obtaining a hybrid material with component B comprising silicon carbide (which is attractive for its mechanical strength, stiffness, oxidation resistance and ability to withstand high temperatures even in the presence of oxygen), component II of the organo-modified mineral should comprise an appropriate form of an organosilicon compound, which, upon heating, pyrolyses, thereby forming silicon carbide. For obtaining a hybrid material with component B comprising boron carbide (which is attractive for its mechanical strength, stiffness, oxidation resistance and ability to withstand high temperatures even in the presence of oxygen), component II of the organo-modified mineral should comprise an appropriate form of an organoboron compound, which, upon heating, pyrolyses, thereby forming boron carbide. For obtaining a hybrid material with component B comprising tellurium (which is attractive as a thermoelectric material), component II of the organo-modified mineral should comprise an appropriate form of an organotellurium compound, which, upon heating, pyrolyses, thereby forming tellurium. For obtaining a hybrid material with component B comprising bismuth telluride (which is attractive for its thermoelectric behavior), component II of the organo-modified mineral should comprise appropriate proportions of appropriate forms of organotellurium and organobismuth compounds, which, upon heating, pyrolyse, thereby forming bismuth telluride.

For obtaining a hybrid material with component A comprising mullite (which is attractive for its mechanical strength, stiffness and ability to withstand high temperatures, even in the presence of oxygen), component I of the organo-modified mineral should comprise an appropriate form of aluminum silicate, which, upon heating, forms mullite. For obtaining a hybrid material with component A comprising zeolite (which is attractive for its effectiveness as an adsorbent), component I of the organo-modified mineral should comprise an appropriate form of aluminum silicate, which, upon heating, forms zeolite. For obtaining a hybrid material with component A comprising crystobalite (which is attractive for its mechanical strength, stiffness and ability to withstand high temperatures, even in the presence of oxygen), component I of the organo-modified mineral should comprise an appropriate form of silicate, which, upon heating, forms crystobalite. For obtaining a hybrid material with component A comprising tellurium (which is attractive for its thermoelectric behavior), component I of the organo-modified mineral should comprise an appropriate from of a tellurium-containing mineral (e.g., tetradymite and telluride mineral), which, upon heating, forms tellurium. For obtaining a hybrid material with component A comprising bismuth telluride (which is attractive for its thermoelectric behavior), component I of the organo-modified mineral should comprise an appropriate form of a mineral that contains tellurium and/or bismuth (e.g., tellurobismuthite, tetradymite, telluride mineral, bismuthinite, bismutite, bismite, berryite, kobellite, and combinations thereof), which, upon heating, forms bismuth telluride.

The hybrid material can be used along with an additional solid ingredient in order to provide a composite material that exhibits the desired properties. The additional solid ingredient may be continuous fibers, discontinuous fibers, nanofibers, nanotubes, particles, platelets, sheets, and combinations thereof. For example, the additional solid ingredient may be continuous carbon fibers, which exhibit high stiffness, high strength, and are thus attractive for their ability to reinforce. In addition, carbon fibers exhibit electrical conductivity, which is attractive for thermoelectricity production and electromagnetic interference shielding.

In case that the hybrid material is present with an additional solid ingredient in the composite material, the hybrid material and the additional solid ingredient can both contribute to enhancing the same property (such as the strength) of the composite material. Alternatively, the hybrid material and the additional solid ingredient can contribute to enhancing different properties (such as the strength enhanced by the additional solid ingredient and the vibration damping ability enhanced by the hybrid material) of the composite.

In forming the composite material, a binder is needed to bind the various solid ingredients together, thereby forming a monolithic material. The hybrid material serves as a binder in the composite material.

An additional binder (i.e., an additional matrix precursor) may be further added in order to ensure adequate binding of the solid ingredients in the composite material. The additional matrix precursor contributes to forming the matrix of the composite material during the heating that is involved in making the composite material. In other words, both the organo-modified mineral and the additional matrix precursor serve as matrix precursors. The additional matrix precursor may be selected from the group consisting of organic compounds, organometallic compounds, organophosphorus compounds, organosilicon compounds, organoboron compounds, organobismuth compounds, metallocenes, and combinations thereof.

The binding ability and the functional ability (e.g., the reinforcing ability) of the hybrid material can be controlled by (i) the choice of component I of the organo-modified mineral in terms of both the composition and the morphology, (ii) the choice of component II of the organo-modified mineral in terms of the molecular structure, the yield, the degree of order in the resulting matrix, and the degree of crystallinity in the resulting matrix, and (iii) the choice of the proportions of components I and II of the organo-modified mineral.

The proportions of (i) the organo-modified mineral, (ii) the additional solid ingredient and (iii) the additional matrix precursor (if any), are parameters that are relevant to the design of the composite material.

In case that (i) the additional solid ingredient is continuous carbon fibers, (ii) component B of the hybrid material is elemental carbon, and (iii) the additional matrix precursor, if any, is one that forms elemental carbon upon pyrolysis, the composite material is a carbon-carbon composite material. In a preferred embodiment, the carbon-carbon composite material comprises (a) continuous carbon fibers present in an amount ranging from 40% to 65% of the volume of said composite material, (b) a carbon matrix present in an amount ranging from 20% to 50% of the volume of said composite material, and (c) the hybrid material present in an amount ranging from 2% to 10% of the volume of said composite material.

This invention further provides a method of making a composite material that comprises the hybrid material. The method comprises heating a composition comprising an organo-modified mineral and an additional solid ingredient, said heating being conducted under pressure in the essential absence of oxygen, the temperature of said heating being in the range from 400° C. to 3000° C. and preferably in the range from 800° C. to 1500° C., and said pressure being in the range from 1 MPa to 100 MPa and preferably in the range from 10 MPa to 30 MPa.

Clay is inexpensive and is attractive for its nanostructure, which is associated with its silicate layers that are nanoscale in thickness. The small thickness of the silicate layers is attractive for providing a large area of the interface between the silicate layers and the carbon matrix in the resulting composite. Furthermore, clay typically comprises silicate layers that are ordered, i.e., the layers exhibit long-range crystalline order. The ordered structure facilitates the clay to affect the structure of component II.

In order to form an organo-modified mineral, a mineral is selected and component II is introduced into the voids inside the mineral. In case that the mineral has a layered structure, component II is preferably introduced into the interlayer region of the mineral. In case that the mineral has a tubular structure, component II is preferably introduced into the interior of the tube of the mineral.

The introduction of component II to a mineral can involve immersion of the mineral in a liquid form of component II. Heating may be needed to melt component II in order to obtain a liquid form. The excess part of the material that is to become component II can be removed by centrifugation, followed by drying.

Another method of introducing component II to a mineral involves dissolving a solid form of component II in a solvent and immersion of the mineral in the solution.

Yet another method of introducing component II to a mineral involves grinding a solid form of component II with the mineral.

EXAMPLES

Example 1

Ingredients

This example describes the ingredients used for evaluation of the invented materials in comparison with competing materials.

Organo-modified clay (called organoclay, also called nanoclay) is manufactured by modifying clay with quaternary ammonium cations via a cation exchange process. The organoclay used is a natural montmorillonite that has been intercalated with a quaternary ammonium salt (dimethyl, dihydrogenated tallow) with chloride anions. Montmorillonite constitutes 90% of the composition of an industrial grade bentonite. The basal spacing $d_{001}$=31.5 Å, as shown by X-ray diffraction (XRD). The particles are white (more exactly, off white) and have a feathery morphology.

The molecules that constitute the organic component in the organoclay are of the form

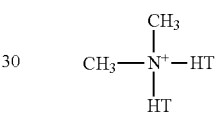

The hydrogenated tallow (abbreviated HT in the schematic above) in the ammonium cation involves ~65% fatty acids with 18 carbon atoms in the alkyl carbon chain in each molecule, ~30% fatty acids with 16 carbon atoms in the chain, and ~5% fatty acids with 14 carbon atoms in the chain. The cation exchange capacity is 125 cmol/kg. The true density of the organoclay is 1.66 g/cm$^3$. The loss on ignition is 43 wt. %. The particle size is such that 10% is less than 2 µm, 50% is less than 6 µm and 90% is less than 13 µm.

Phyllosilicates are inherently hydrophilic, but ion exchange involving the cations in the silicate and the ammonium salt renders the clay more hydrophobic. The organoclay has a reduced surface energy, which is well-suited for use with organic matrices. The layered magnesium aluminum silicate platelets in an organoclay particle are 1 nm thick and 70-150 nm across, with an aspect ratio 70-150 and a surface area exceeding 750 m$^2$/g. This organoclay is the product designated Cloisite 15A, as provided by Southern Clay Products, Inc., Gonzales, Tex.

There are two main classes of bentonite, based on the dominant exchangeable ion that is weakly bound in the interlayer of montmorillonite. They are sodium bentonite and calcium bentonite. Sodium bentonite swells more in water than calcium bentonite and has excellent colloidal properties. For the sake of comparison, clay without an organic component is also used, namely sodium bentonite (Asbury Graphite Mills, Inc., Asbury, N.J., M325). It contains 2-6% free $SiO_2$ and has less than 10% moisture. It has a cation exchange capacity (CEC) 92 cmol/kg, true density 2 g/cm$^3$ and negligible solubility in water; 98.65% of the powder passes through U.S. 325 mesh (corresponding to 44 µm).

The continuous carbon fibers are Thornel P-25X mesophase-pitch-based fibers (without sizing and without twist) from Cytec Industries Inc, Woodland Park, N.J. It is in the form of 2,000-filament tows, with tensile strength 1.56 GPa, tensile modulus 159 GPa, true density 1.92 g/cm$^3$, diameter 10 μm and carbon content 97+%.

The pitch used as the additional carbon matrix precursor for both the composite fabrication and the subsequent optional densification process is mesophase pitch powder (coal tar pitch, with average particle size 20 μm, softening temperature slightly above 300° C. and coking value 0.8) from Koppers Inc., Pittsburgh, Pa. The dispersant for dispersing the pitch in water is poly(ethylene oxide) (PEO), a water soluble resin powder (UCARFLOC Polymer 310, Dow Chemical Co, Midland, Mich.).

Example 2

Carbon-Carbon Composite Fabrication Method

This example describes the method used for the fabrication of carbon-carbon (abbreviated C/C) composites. The ingredients are as described in Example 1.

The organoclay and pitch powder in the mass ratio of 1:4 are dry mixed in a ball mill (without grinding balls) for 24 h for the purpose of initial mixing. Then the mixture is dispersed in water that contains 0.1 wt. % dissolved PEO, such that the dispersion contains 10 wt. % organoclay-pitch mixture. The dispersion is stirred manually for 10-20 min, followed by 2.0 h of magnetic stirring, in order to achieve an adequate degree of mixing. The carbon fiber tow is immersed in the dispersion for 3.0 h in order for the tow to be coated with the organoclay-pitch mixture.

The mass ratio of the immersed fibers to pitch (in the dispersion) to organoclay (also in the dispersion) is 50:40:10. This proportion is such that the entirety of the liquid-based dispersion is consumed in coating the immersed fibers. Thus, the mass ratio of the fibers to pitch to organoclay in the prepreg is also 50:40:10. In other words, the prepreg contains 50 wt. % fibers, 40 wt. % pitch and 10 wt. % organoclay.

After removal of the tow from the dispersion, the tow is placed on a piece of Teflon (polytetrafluoroethylene) sheet, such that 17 tows are manually aligned to form a prepreg sheet of size 290×38 mm. Multiple sheets are made.

After this, the prepreg sheets are cut into discs of diameter 31.8 mm. A total of 8 discs are then unidirectionally stacked to form a cylinder. The stacked discs are allowed to dry in air at room temperature, followed by hot pressing in a graphite mold under a nitrogen purge at a flow of 70 ml/min for the purpose of pyrolysis (carbonization). The temperature is first raised from room temperature (20° C.) to 300° C. in a period of 1.0 h without pressure application, such that the heating rate is constant. After this, the temperature is increased from 300 to 700° C. over a period of 1.0 h at a uniaxial pressure of 21 MPa, such that the heating rate is constant. Then the temperature is increased from 700 to 1,000° C. over a period of 1.0 h at the same pressure, such that the heating rate is constant. Finally the temperature is maintained at 1,000° C. for 30 min at the same pressure. After this, cooling is conducted naturally in the furnace under nitrogen, which is maintained until the temperature has reached 300° C.

One cycle of densification in the form of pitch impregnation and recarbonization is optionally conducted for the C/C composite without a filler (i.e., without organoclay). However, densification is not conducted for the composite with organoclay. In the impregnation, 1.00 g of pitch powder is placed below the carbonized composite in the graphite mold and another 1.00 g of pitch powder is placed above it. The sandwich is then heated to 360° C. at 5° C./min at an applied pressure of 5 MPa at temperatures from 300 to 360° C. Upon reaching 360° C., a pressure of 10.0 MPa is applied. The highest temperature of 360° C. is maintained for 2.0 h under the pressure of 10.0 MPa. After the impregnated sandwich has been cooled (within the furnace without an applied pressure) to 300° C., it is immediately reheated to 1000° C. at 6° C./min under a pressure of 16 MPa for the purpose of recarbonization. The highest temperature of 1000° C. is maintained for 30 min under the pressure of 16 MPa. Purging nitrogen gas at a flow of 70 ml/min is applied throughout the impregnation and recarbonization process. After cooling to room temperature, the excessive carbonized pitch is detached from the composite specimen.

Example 3

Ceramic-Carbon Hybrid Material Fabrication Method

This example describes the method of fabricating a ceramic-carbon hybrid material. The ingredients are as described in Example 1.

Clay particles in the amount of 4.00 g (unless stated otherwise) are hot-pressed in the absence of any other ingredient, using the same graphite mold and the same process as in Example 2. Two types of clay particles are used, namely organoclay and sodium bentonite (without an organic component), in order to investigate the effect of the organic component. Either type of clay is placed in the graphite mold under a nitrogen purge at a flow of 70 ml/min.

Example 4

Mechanical Testing Method

This example describes the method of mechanical testing. The materials are fabricated as described in Examples 2 and 3. The ingredients are as described in Example 1.

Longitudinal flexural testing is conducted under three-point bending up to failure at a span of 20 mm, using a hydraulic mechanical testing system (MTS Systems Corp., Eden Prairie, Minn.). Two beam-shaped specimens are obtained from each disc of material to be tested by cutting along two parallel lines parallel to a diameter of the disc, so that each specimen has a width ranging from 9.1-10.3 mm, as separately measured for each specimen. Hence, two specimens are tested for each disc and at least 2 discs (separately fabricated) are tested for each composition. The flexural ductility is taken as the flexural strain at the maximum stress in the stress-strain curve up to failure. The flexural toughness, which corresponds to the work of fracture per unit volume, is the area under the stress-strain curve, with the area including the tail up to zero stress.

Example 5

Thermal Stability Evaluation Method

This example describes the method of evaluating the thermal stability, i.e., the ability to withstand elevated temperatures.

The thermal stability is evaluated under purging nitrogen by thermogravimetric analysis (TGA) using a thermogravimetric analyzer (TGA 7, Perkin-Elmer Corp.). In spite of the controlled nitrogen purge, air is present. The weight is measured at a heating rate of 5° C./min from room temperature to 850° C., immediately followed by furnace cooling at an approximate cooling rate of 15° C./min.

Example 6

X-Ray Diffraction Method

This example describes the powder method of X-ray diffraction, which is a technique for identifying the phases in a material. This method is used to analyze a ceramic-carbon hybrid material fabricated according to the method of Example 3 and C/C composites fabricated according to the method of Example 2.

The material to be analyzed is ground into a powder by using a mortar and a pestle prior to XRD. The XRD involves CuKα radiation (40 kV, 30 mA) and a Siemens Kristalloflex D500 diffractometer equipped with a diffracted-beam graphite monochromator. The digital data collection is accomplished with Materials Data Inc. (Livermore, Calif.) Data Scan software.

Example 7

Raman Scattering Spectroscopy Method

This example describes the method of Raman scattering spectroscopy, which is a technique that is effective for analyzing elemental carbon materials.

Raman spectra are acquired using a Jobin-Yvon Horiba Labram HR spectrometer coupled to an Olympus BX41 microscope, using the 514.5 nm laser excitation from an Ar-ion laser. An 1800 lines/mm grating is used to acquire the spectra, yielding a spectral resolution greater than 2 $cm^{-1}$. The laser power was kept below 1 mW to minimize local heating. The material is in a sheet form.

Example 8

Electrical Resistivity Measurement Method

This example describes the method of electrical resistivity measurement. This method is used to analyze a ceramic-carbon hybrid material fabricated according to the method of Example 3. For the sake of comparison, it is also used to analyze hot-pressed bentonite.

The material to be tested is in the shape of a disc. Measurement of the DC (direct current) electrical resistivity is conducted in the plane of the sheet. Each disc is cut along lines that are parallel to the diameter of the disc to form two strips. The measurement is conducted by using a high-precision resistance multimeter and silver paint (in conjunction with fine copper wires) for the electrical contacts. The two-probe method is used, due to the high resistivity involved and the ineffectiveness of the four-probe method for this resistivity range.

Example 9

Density Measurement Method

This example describes the method of density measurement.

The density of a material is measured by weighing a plate-shaped specimen, calculation of the volume of the specimen based on the measured dimensions, and dividing the weight by the volume.

Example 10

Structure and Properties of Carbon-Carbon Composites

This example describes the structure and properties of the carbon-carbon composite materials, including those with and without incorporation of a ceramic-carbon hybrid material that is formed from montmorillonite organoclay. The composite materials are fabricated using the method described in Example 2. The ingredients are as described in Example 1.

The organic component in the organoclay is at least partly converted to elemental carbon during the pyrolysis, as shown by Raman scattering conducted using the method described in Example 7.

TABLE 1

Thickness, true density and flexural properties of 8-lamina C/C composites with and without a ceramic-carbon hybrid material that is formed from montmorillonite organoclay.

|  | Without the hybrid material | | With the hybrid material |
|---|---|---|---|
|  | Without densification | With densification | (without densification) |
| Thickness (mm) | 1.064 ± 0.003 | 1.012 ± 0.015 | 1.086 ± 0.006 |
| True density (g/$cm^3$) | 1.677 ± 0.001 | 1.692 ± 0.002 | 1.679 ± 0.008 |
| Strength (MPa) | 178.6 ± 3.6 | 235 ± 24 | 293.2 ± 24.3 |
| Modulus (GPa) | 37.6 ± 6.0 | 54,0 ± 0,4 | 55.0 ± 6.3 |
| Ductility (%) | 0.63 ± 0.32 | 0.49 ± 0.04 | 0.67 ± 0.15 |
| Toughness (MJ/$m^3$) | 2.0 ± 0.8 | 1.3 ± 0.1 | 2.9 ± 0.6 |

The measured true density of the 8-lamina composite is increased by 0.9% by the densification and is essentially unaffected by the ceramic-carbon hybrid material incorporation (without densification), as shown in Table 1. Based on the measured composite thickness, the fiber lamina thickness is 130-140 μm. The organoclay particles coat the exterior and parts of the interior of each tow.

The carbon yield of the mesophase pitch is 80%. The mass ratio of the fibers to the pitch to the organoclay of 50:40:10 thus corresponds to a mass ratio of the fibers to the carbon matrix to the organoclay of 50:32:10. With the loss on ignition being 43 wt. % for the organoclay, 57% of the mass of the organoclay remains as an inorganic solid (without organic component or elemental carbon) after pyrolysis. This inorganic solid is a combination of disordered clay, mullite and cristobalite, as shown by XRD conducted using the method described in Example 6, so this inorganic solid is in the form of ceramics. The elemental carbon resulting from the carbonization of the organic component of the organoclay consists of ordered and disordered carbons in the graphite family, as shown by Raman scattering conducted using the method described in Example 7. The ceramics and elemental carbon, both resulting from the organoclay, are in the form of a ceramic-carbon nanostructured hybrid. If the organic component of the organoclay has carbon yield of y by weight after carbonization, the mass ratio of the fibers to the carbon matrix to the hybrid filler becomes 50:32:(5.7+4.3 y). As shown by further analysis, y=12%. Thus, the mass ratio of the fibers to the carbon matrix to the hybrid filler is 50:32:6.2, and the C/C composite with the ceramic-carbon hybrid material contains 56.7 wt. % fibers, 36.3 wt. % carbon matrix and 7.0 wt. % ceramic-carbon hybrid material.

The measured true density $\rho_o$ (1.677 g/$cm^3$, Table 1) of the composite without the ceramic-carbon hybrid material (without densification) is related to the true density of the carbon fibers (1.92 g/cm³) and the density ($\rho_m$) of the carbon matrix (with the porosity included) according to the Rule of Mixtures, i.e., $$\rho_o = V_f(1.92) + (1-V_f)\rho_m, \quad (1)$$

where $V_f$ and $1-V_f$ are the volume fractions of the fibers and the carbon matrix respectively. With the mass ratio of the fibers to the matrix being 50:32, i.e., fiber content=61 wt. %, $V_f$ is given by $$V_f = (61/1.92)/[(61/1.92) + (39/\rho_m)]. \quad (2)$$

Substitution of Eq. (2) in Eq. (1) gives $$\rho_m = 1.40 \text{ g/cm}^3. \quad (3)$$

Substitution of Eq. (3) in Eq. (2) gives $V_f$=53 vol. %. This means that the matrix content is 47 vol. %.

If the carbon matrix in the absence of the porosity is assumed to be 1.8 g/cm³, the porosity in the carbon matrix (with the porosity included) is given by $$\text{the porosity in the carbon matrix} = 1-(1.41/1.8) = 22\%. \quad (4)$$

Although the calculation lumps the porosity with the carbon matrix, the porosity is not physically tied to the carbon matrix. The substantial porosity is a consequence of the low carbonization temperature of 1,000° C. This porosity is actually not only in the carbon matrix, which amounts to 47% of the volume of the overall composite, so the porosity of the overall composite is (0.47) (22%)=10%. This porosity includes both open and closed pores.

The true density $\rho_o$ (1.692 g/cm³, Table 1) of the composite without the ceramic-carbon hybrid material, but with densification, is related to the true density of the carbon fibers (1.92 g/cm³) and the density ($\rho_m$) of the carbon matrix (with the porosity included) according to Eq. (1). Substitution of Eq. (2) in Eq. (1) gives $$\rho_m = 1.43 \text{ g/cm}^3. \quad (5)$$

Substitution of Eq. (3) in Eq. (2) gives $V_f$=54 vol. %. This means that the matrix content is 46 vol. %. The porosity in the carbon matrix (with the porosity included) is given by $$\text{the porosity in the carbon matrix} = 1-(1.43/1.8) = 21\%. \quad (6)$$

In the absence of the ceramic-carbon hybrid material, the densification increases the matrix density from 1.40 to 1.43 g/cm³, increases the fiber content from 53 to 54 vol. %, decreases the matrix content from 47 to 46 vol. %, and decreases the porosity in the matrix from 22% to 21%, and essentially does not affect the porosity (10%) in the overall composite.

The densification increases the flexural strength and modulus by 31% and 42% respectively (Table 1 and FIG. 1), as expected due to the increase in density. However, it decreases the flexural toughness and ductility by 38% and 22% respectively, probably due to the enhanced fiber-matrix bonding.

In the presence of the ceramic-carbon hybrid material in the composite (without densification), the fibers, the matrix and the filler have mass ratio 56.7:36.3:7.0, and the true density p of the composite is given by $$\rho = V_f(1.92) + V_m\rho_{m'} + V_h\rho_h, \quad (7)$$

where $V_m$ and $V_h$ are the volume fractions of the matrix and filler respectively, and $\rho_{m'}$ and $\rho_h$ are the densities of the matrix and filler respectively. The density of the matrix ($\rho_{m'}$) is not the same as that for the composite without filler ($\rho_m$). With $\rho$=1.679 g/cm³ (Table 1), Eq. (7) gives $$\rho_{m'} = 1.34 \text{ g/cm}^3. \quad (8)$$

Again assuming that the density of the carbon matrix without porosity is 1.8 g/cm³, $$\text{the porosity of the composite containing the filler} = 1-(1.34/1.8) = 26\%. \quad (9)$$

This porosity is actually not only in the carbon matrix, which amounts to 45% of the volume of the overall composite, so the porosity of the overall composite is (0.45) (26%)=12%. Hence, the composite with the filler incorporation (without densification) contains 57 wt. % (50 vol. %) fibers, 36 wt. % (33 vol. %) carbon matrix (with the porosity excluded), 7 wt. % (5 vol. %) filler, and 12% porosity.

The incorporation of the ceramic-carbon hybrid material to the composite (without densification) causes the composite porosity to increase slightly from 10% to 12%, and causes the fiber volume fraction to decrease from 53% to 50%. In spite of the decrease in the fiber volume fraction and the slight increase in porosity, the ceramic-carbon hybrid material incorporation (without densification) causes increases in the flexural strength (64% increase relative to the composite without the ceramic-carbon hybrid material or densification), the flexural modulus (46% increase relative to the composite without the ceramic-carbon hybrid material or densification) and the flexural toughness (45% increase relative to the composite without the ceramic-carbon hybrid material or densification (Table 1 and FIG. 1). The ductility is essentially not affected by the the ceramic-carbon hybrid material incorporation. Relative to the composite without the ceramic-carbon hybrid material but with densification, the ceramic-carbon hybrid material incorporation increases the flexural strength by 25%, increases the ductility by 37% and increases the toughness by 130%, with essentially no effect on the modulus. Thus, the properties of the composite with the ceramic-carbon hybrid material but without densification are superior to those of the composite without the ceramic-carbon hybrid material but with densification. It is practically significant that the incorporation of the ceramic-carbon hybrid material produces a C/C composite that exhibits high flexural strength and modulus, in spite of the absence of densification.

The presence of mullite and cristobalite in the ceramic-carbon hybrid material, as shown by XRD (conducted using the method described in Example 6), is believed to contribute to the effectiveness of the ceramic-carbon hybrid material as a reinforcement. Significant preferred orientation in the plane of the laminate is expected for the ceramic-carbon hybrid material, due to the confined location of the ceramic-carbon hybrid material between the carbon fiber laminae and the large aspect ratio of the ceramic-carbon hybrid material. This preferred orientation probably also contributes to the effectiveness of the ceramic-carbon hybrid material in increasing the flexural strength and modulus of the composite. However, an important cause for the ability of the ceramic-carbon hybrid material to strengthen the C/C composite is that the ceramic-carbon hybrid material is also a binder. The improved binding enabled by the ceramic-carbon hybrid material strengthens the composite.

Since the fibers are the dominant component for providing strength and modulus to the composite without the ceramic-carbon hybrid material, the strength and modulus of this composite may be scaled (based on the Rule of Mixtures) to values corresponding to the fiber volume fraction in the composite containing the ceramic-carbon hybrid material. This scaling allows study of the the ceramic-carbon hybrid material effect when the fiber volume fraction is fixed. With the scaling of the strength and modulus of the composite through multiplication by the factor 50/53 for the composite without densification and by the factor 50/54 for the composite with densification (i.e., when the fiber volume fraction is fixed at 50 vol. % for all the composites), the ceramic-carbon hybrid material incorporation is thus found to increase the strength by 74% relative to the composite without the ceramic-carbon hybrid material or densification and by 35% relative to the composite without the ceramic-carbon hybrid material but with densification, and to increase the modulus by 55% relative to the composite without the ceramic-carbon hybrid material or densification and by 10% relative to the composite without the ceramic-carbon hybrid material but with densification. The effect of the ceramic-carbon hybrid material on the mechanical properties is more significant if the scaling is performed.

The high toughness of the C/C composite with the ceramic-carbon hybrid material is attributed to the large area of the interface between the ceramic and carbon components in the nanostructured ceramic-carbon hybrid material and the nanoplatelet morphology of the hybrid material. The slight slippage at the interfaces consumes mechanical energy during deformation.

The effect of the ceramic-carbon hybrid material incorporation on the flexural strength is greater than that on the flexural modulus, whether the comparison is relative to the composite with or without densification. This means that the ceramic-carbon hybrid material affects the fracture behavior more significantly than the elastic deformation behavior. This is consistent with the fact that the ceramic-carbon hybrid material mainly resides at the interlaminar interface, which tends to be the site for damage to occur prior to fracture, and that the ceramic-carbon hybrid material contributes to serving as a binder.

Figure 2:
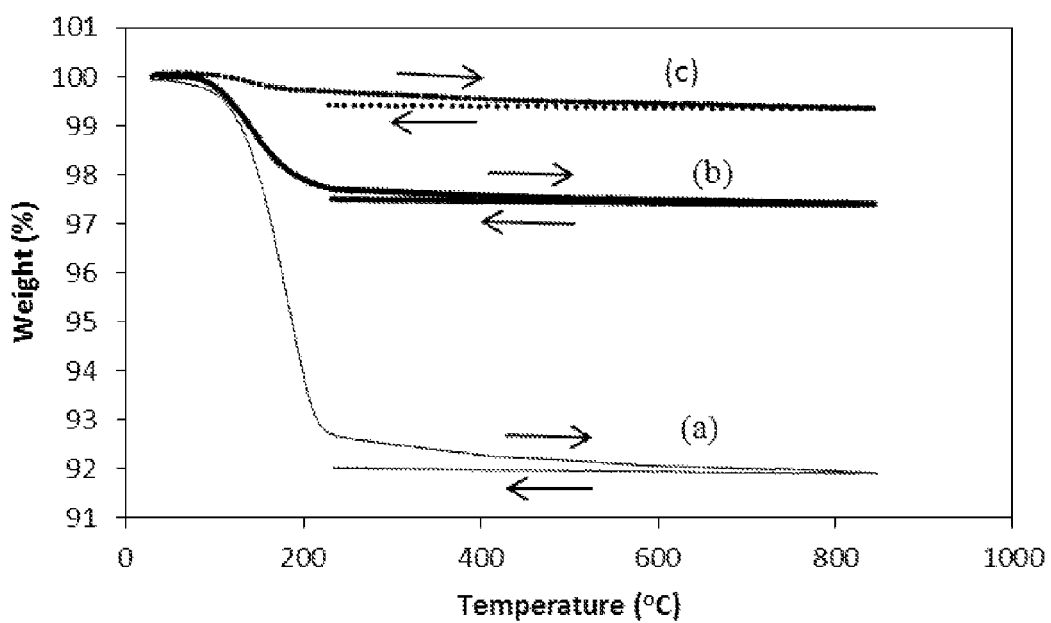
FIG. 2 show thermogravimetric analysis (TGA) curves of the C/C composites. (a) Composite without the a or densification. (b) Composite without a filler but with densification. (c) Composite with an organoclay filler but without densification.

FIG. 2 shows thermogravimetric analysis (TGA, conducted using the method described in Example 5) results for the composites. The thermal stability increases in the order: the composite without the ceramic-carbon hybrid material and without densification, the composite without the ceramic-carbon hybrid material but with densification, and the composite with the ceramic-carbon hybrid material but without densification. Although the composite with the ceramic-carbon hybrid material exhibits higher porosity (12%) than the composite without the hybrid material (10%, whether with or without densification), the thermal stability is superior. This suggests that that the pores in the composite with the ceramic-carbon hybrid material are less accessible than those in the composite without the ceramic-carbon hybrid material, due to their smaller size.

Example 11

Structure and Properties of a Ceramic-Carbon Hybrid Material

This example describes the structure and properties of a ceramic-carbon hybrid material formed by hot-pressing from montmorillonite-based organoclay in the absence of any other ingredient. The hot pressing is conducted using the method described in Example 3. The ingredients are as described in Example 1. The testing uses the methods described in Examples 4-9.

The yield of the organoclay after hot pressing is $(49.8\pm0.3)$% by mass, as obtained by weighing before and after the hot pressing. The weight loss [$(50.2\pm0.3)$%] due to the hot pressing is contributed by both the ceramic and organic components of the organoclay, as shown by the fact that the loss on ignition is 43 wt. %.

Before hot pressing, the organoclay is in the form of particles. After hot pressing the organoclay (4.00 g) in the absence of the pitch or the carbon fibers, the organoclay becomes a coherent sheet of thickness 1.1 mm and true density 2.366 g/cm$^3$. This means that the organoclay has binding ability, which contributes to the effectiveness of the filler in reinforcing the C/C composites (Example 10).

Figure 3:
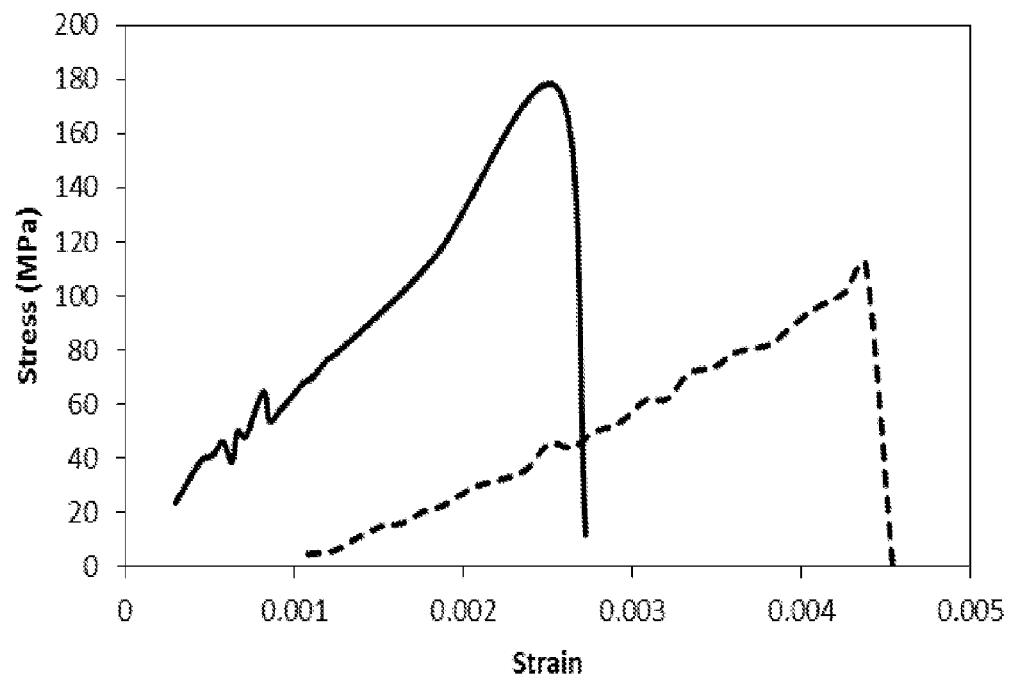
FIG. 3 shows representative flexural stress-strain curves for ceramic-carbon hybrid material sheets obtained by hot-pressing organoclay in the absence of any other ingredient. Solid curve: the clay being montmorillonite-based organoclay. Dashed curve: the clay being sodium bentonite.

Flexural testing gives strength 175.5±3.2 MPa, modulus 69.4±2.5 GPa, toughness 0.23±0.02 MPa and ductility (0.26±0.01)%. A representative flexural stress-strain curve is shown in FIG. 3. The tail present in each of the stress-strain curves for the C/C composites at strains above that at the highest stress (FIG. 1) is absent in FIG. 3. Comparison of the flexural property values of the ceramic-carbon hybrid material with those in Table 1 for the C/C composites shows that (i) the flexural strength of the ceramic-carbon hybrid material is similar to that of the C/C composite without the hybrid material or densification, but is lower than that of the C/C composite without the ceramic-carbon hybrid material but with densification and lower than that of the C/C composite with the ceramic-carbon hybrid material, (ii) the flexural modulus is higher than all of the values in Table 1, (iii) the flexural ductility is lower than all of the values in Table 1, and (iv) the flexural toughness is much lower than all of the values in Table 1. The low ductility, low toughness and the absence of a tail in the stress-strain curve are consistent with the absence of fibers. The high modulus and strength of the ceramic-carbon hybrid material are consistent with the effectiveness of the ceramic-carbon hybrid material in reinforcing the C/C composites (Example 10).

Figure 4:
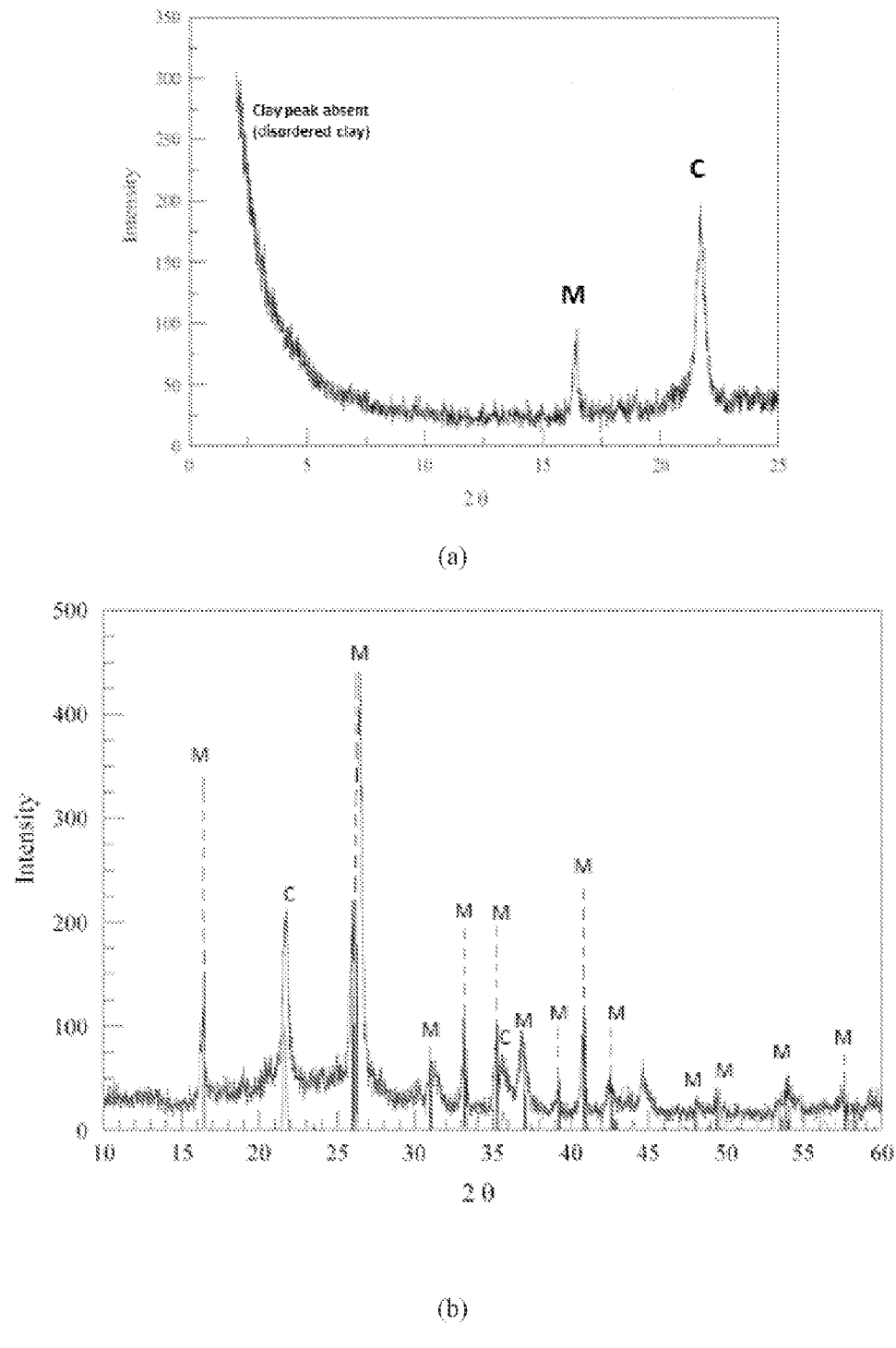
FIG. 4 shows X-ray diffraction (XRD) pattern (diffraction intensity versus the diffraction angle 2θ in degrees) of the hybrid material obtained by the hot-pressing of montmorillonite-based organoclay in the absence of any other ingredient. M=mullite. C=cristobalite. (a) A low-angle XRD scan and (b) a higher-angle XRD scan. The dashed lines in (b) indicate the expected diffraction lines for mullite. The thin solid lines in (b) indicate the expected diffraction lines for cristobalite. No graphite peak is observed.

Powder XRD conducted for organoclay prior to hot pressing shows that the organoclay is mainly montmorillonite with basal spacing $d_{001}$=31.5 Å. For the ceramic-carbon hybrid material obtained by the hot pressing of organoclay in the absence of any other ingredient, FIG. 4(a) shows that the montmorillonite is disordered and FIG. 4(b) shows that mullite and cristobalite (SiO$_2$, without distinction between the α and β forms of cristobalite) have formed. Mullite contains about 60 mol % Al$_2$O$_3$ and is a phase in the SiO$_2$—Al$_2$O$_3$ binary phase diagram. Both mullite and cristobalite are attractive for their high stiffness, high hardness and high melting temperatures (1890° C. and 1713° C. for mullite and cristobalite respectively). In addition, the hot pressing causes the clay to lose water (both interlayer water molecules and structural hydroxyls) and become disordered, as shown by the disappearance of the organoclay peak (31.5 Å) and the appearance of a long tail that rises at low diffraction angles. In other words, the inorganic component in the organoclay has become a multi-phase mixture of mullite, cristobalite and disordered clay. No graphite diffraction peak is observed in the organoclay after hot pressing, possibly due to the turbostratic nature of the carbon.

Figure 5:
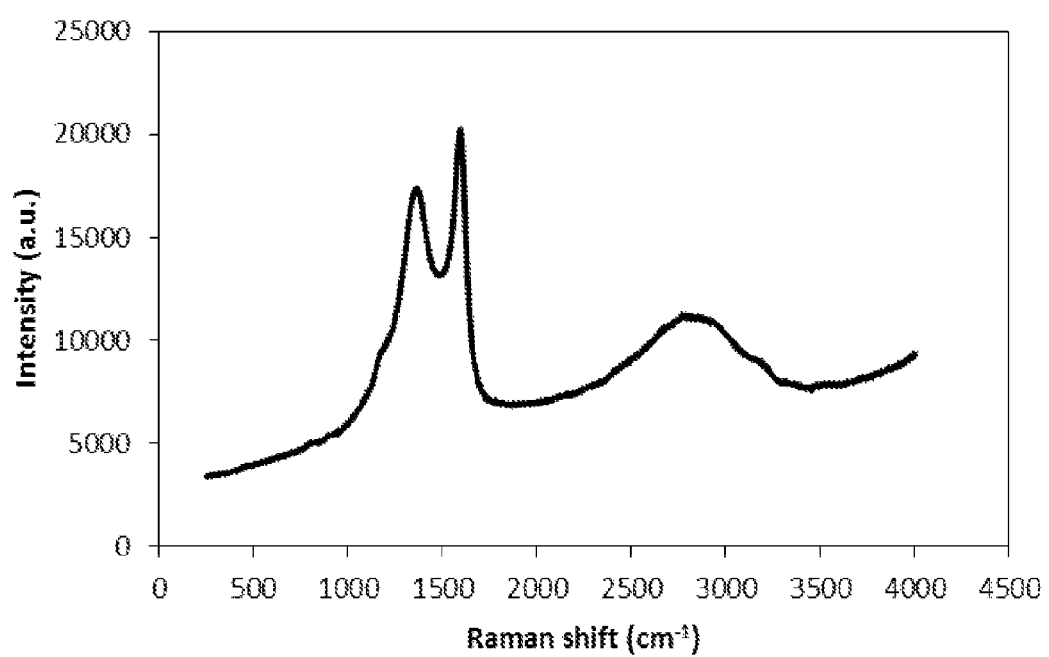
FIG. 5 shows the Raman spectrum of the hybrid material obtained by the hot-pressing of montmorillonite-based organoclay in the absence of any other ingredient, with the disordered graphite peak at 1375 $cm^{-1}$, the ordered graphite peak at 1600 $cm^{-1}$ and a broad peak at 2800 $cm^{-1}$ (probably due to C—H).

Raman scattering shows that the ceramic-carbon hybrid material contains elemental carbon. Both the 1600 cm$^{-1}$ E$_{2g2}$ graphite peak and the 1375 cm$^{-1}$ disordered graphite peak are observed (FIG. 5(a)), indicating the presence of elemental carbon in the graphite family. A broad and relatively weak peak centered at 2800 cm$^{-1}$ is also observed and is probably due to the C—H stretch vibration. Moreover, the organoclay after hot pressing is black, whereas that before hot pressing is white. The electrical resistivity is $(6.40\pm0.84)\times10^6$ Ω·cm for the organoclay after hot pressing.

The phases in the ceramic-carbon hybrid material include mullite, cristobalite, disordered clay, ordered carbon and disordered carbon. The ordered and disordered carbons, both in the graphite family, are formed by the carbonization of the organic component of organoclay.

The ceramic-carbon hybrid material formed by hot pressing montmorillonite-based organoclay in the absence of any other ingredient is a continuous sheet of size limited by the size of the mold cavity (diameter 31.8 mm).

TGA shows a weight loss of 0.02% upon heating the ceramic-carbon hybrid material to 850° C., compared to a corresponding value of 0.6% for the C/C composite with incorporation of the ceramic-carbon hybrid material (FIG. 2). This means that the ceramic-carbon hybrid material is much more oxidation resistant than the C/C composite with incorporation of the ceramic-carbon hybrid material. The superior thermal stability of the ceramic-carbon hybrid material is partly attributed to the relatively low porosity. It is also partly attributed to the relatively low carbon content (14 vol. %) of the ceramic-carbon hybrid material and the superior high-temperature stability of the ceramic component (86 vol. %) compared to the carbon component of the ceramic-carbon hybrid material.

The ceramic-carbon hybrid material formed from montmorillonite-based organoclay is nanoscale and layered in structure, due to such a structure in the organoclay, its parent.

Example 12

Structure and Properties of Sodium Bentonite that has been Hot-Pressed in the Absence of any Other Ingredient In contrast to organoclay, sodium bentonite does not have an organic component. This example describes the structure and properties of sodium bentonite that has been hot-pressed in the absence of any other ingredient. The hot pressing is conducted using the method described in Example 3. The ingredients are as described in Example 1. The testing uses the methods described in Examples 4-9.

The yield of the sodium bentonite after hot pressing is $(79\pm3)$% by mass. That the yield is not 100% means that there are volatile components evolved during the decomposition of the clay. This is consistent with the fact that the weight loss in connection with the yield of the organoclay exceeds that of the loss on ignition.

The sodium bentonite is light grey in color before hot pressing and is dark grey (but not black) after hot pressing. XRD of the hot-pressed sodium bentonite shows mullite, cristobalite and disordered clay, as for the hot-pressed organoclay, although the number of peaks is smaller than that for the hot-pressed organoclay (FIG. 4($b$)). This means that the presence of the organic component influences the formation of the ceramic phases from the inorganic component. The Raman spectrum of hot-pressed sodium bentonite shows no peak other than a broad weak peak centered around 2750 $cm^{-1}$ that may be due to the C—H stretch vibration and a very weak peak at 470 $cm^{-1}$ that may be due to the Si—O—Si vibration. Thus, elemental carbon is not formed by hot-pressing sodium bentonite, as expected.

The hot pressing of sodium bentonite yields a coherent sheet, as for the hot pressing of the organoclay. The electrical resistivity is $(1.63\pm0.12)\times10^7$ Ω·cm, which is higher than the value of $(6.40\pm0.84)\times10^6$ Ω·cm for the hot-pressed organoclay. The true density is 2.470 g/cm$^3$. Flexural testing of the hot-pressed sodium bentonite gives strength 107.4±5.0 MPa (lower than the value of 175 MPa for the hot-pressed organoclay), modulus 31.2±0.2 GPa (much lower than the value of 69 GPa for the hot-pressed organoclay), ductility (0.40=0.04)% (higher than the value of 0.26% for hot-pressed organoclay), and toughness (0.175±0.002) MPa (lower than the value of 0.23 MPa for hot-pressed organoclay). A representative stress-strain curve of hot-pressed sodium bentonite is shown in FIG. 3. The curve shows no tail, as in the case of the hot-pressed organoclay (FIG. 3).

Based on the relatively poor mechanical properties, sodium bentonite is not as good a binder as organoclay, as expected from the fact that sodium bentonite does not contain an organic component. Based on the color, the electrical resistivity and the Raman results of the hot-pressed material and the absence of an organic component prior to hot pressing, the hot-pressed sodium bentonite does not contain elemental carbon. The absence of elemental carbon in hot-pressed sodium bentonite contributes to causing the low strength, low modulus and high ductility compared to hot-pressed organoclay. Nevertheless, even though an organic component is absent, sodium bentonite has some binding ability.

Example 13

Thermal Stability of Hot-Pressed Organoclay and Hot-Pressed Sodium Bentonite

This example describes the thermal stability (ability to withstand elevated temperatures) of montmorillonite-based organoclay and sodium bentonite that have been hot-pressed in the absence of any other ingredient. The hot-pressed organoclay is a ceramic-carbon hybrid material. The hot pressing is conducted using the method described in Example 3. The ingredients are as described in Example 1. The testing uses the methods described in Examples 4-9.

Table 2 shows that the thermal stability is superior for hot-pressed organoclay than hot-pressed sodium bentonite. This is consistent with the superior binding ability of organoclay and the possible consequence of less porosity. Table 2 also shows that both the hot-pressed organoclay and the hot-pressed sodium bentonite are much superior to any of the three types of C/C composite in the thermal stability, as expected from the relatively low porosity and the relatively low proportion of carbon in the materials without the carbon fibers. The weight loss of hot-pressed organoclay at 800° C. is 0.08%, compared to 0.7% for the C/C composite with the organoclay.

TABLE 2

Weight loss at various temperatures during heating under identical conditions. Pitch is the additional carbon matrix precursor.

| Material (hot-pressed) | | 200° C. | 400° C. | 600° C. | 800° C. |
|---|---|---|---|---|---|
| Without carbon fibers or pitch | Organoclay | 0.014% | 0.042% | 0.063% | 0.084% |
| | Sodium bentonite | 0.016% | 0.098% | 0.015% | 0.187% |
| With carbon fibers and pitch | C/C without densification | 6.096% | 7.730% | 7.945% | 8.052% |
| | C/C with densification | 2.100% | 2.430% | 2.514% | 2.590% |
| | C/C with organoclay but without densification | 0.344% | 0.527% | 0.618% | 0.699% |

Example 14

Detailed Structure of a Ceramic-Carbon Hybrid

This example describes the detailed structure of a ceramic-carbon hybrid material that is formed from montmorillonite-based organoclay using the method described in Example 3. The ingredients are as described in Example 1.

The organoclay has 57 wt. % ceramic component and 43 wt. % organic component. Since the yield of the sodium bentonite is 79%, the yield of the ceramic component of the organoclay after hot pressing is taken as 79%. The yield of the organoclay (both ceramic and organic components considered together) is 50%. This means that the yield of the organic component of the organoclay is 12%.

Since (i) the organoclay before hot pressing has 57 wt. % ceramic component and 43 wt. % organic component, (ii) the ceramic component has a yield of 79% after hot pressing, and (iii) the yield of the organic component is 12%, the mass ratio of the ceramic component to the carbon component after hot pressing is 57(0.79):43(0.12), i.e., 45:5.2. In other words, the ceramic-carbon hybrid material contains 89.7 wt. % ceramic component and 10.3 wt. % carbon component.

Based on the true density of the ceramic-carbon hybrid (i.e., the hot-pressed organoclay, 2.366 g/cm$^3$) and the true density of the ceramic part of the hybrid (i.e., the hot-pressed sodium bentonite, 2.470 g/cm$^3$), the proportion of the constituents of the hybrid can be calculated by using the Rule of Mixtures for the true density.

$$2.366 = 2.470 V_c + \rho_{hc}(1-V_c), \quad (10)$$

where $V_c$ is the volume fraction of the ceramic component in the hybrid, $(1-V_c)$ is the volume fraction of the elemental carbon component in the hybrid, and $\rho_{hc}$ is the density of the elemental carbon in the hybrid. Based on the abovementioned fact that the hybrid contains 89.7 wt. % ceramic component and 10.3 wt. % carbon component, $$1 - V_c = (10.3/\rho_{hc})/[(89.7/2.470) + (10.3/\rho_{hc})]. \quad (11)$$

Simultaneous solution of Eq. (10) and (11) gives $V_c$=0.86 and $\rho_{hc}$=1.73 g/cm$^3$. Hence, the ceramic component of the hybrid amounts to 86 vol. % whereas the carbon component of the hybrid amounts to 14 vol. %. The density 1.73 g/cm$^3$ of the carbon component is higher than the density $\rho_m$=1.34 g/cm$^3$ of the carbon matrix in the C/C composite containing the ceramic-carbon hybrid material. Assuming that the true density is 1.8 g/cm$^3$ for carbon without porosity, the porosity in the carbon component of the hybrid is 4%.

The ceramic component of the ceramic-carbon hybrid material consists of mullite, cristobalite and disordered clay. Based on the relative intensities of the XRD peaks in FIG. 4(a), it is estimated that the volume fraction of mullite is twice of that of cristobalite. Based on the Rule of Mixtures for the true density of the ceramic component, $$2.470 = 3.16 V_u + 2.33 V_u/2 + 2.457(1 - 1.5 V_u), \quad (12)$$

where 3.16 g/cm$^3$, 2.33 g/cm$^3$ and 2.457 g/cm$^3$ are the densities of mullite, cristobalite and clay (bentonite) respectively. Solution of Eq. (12) gives $V_u$=0.02. This means that the ceramic component of the hybrid contains 2 vol. % mullite, 1 vol. % cristobalite and 97 vol. % disordered clay. If the volume fraction of mullite is equal to that of cristobalite, a similar calculation gives similar results, namely 2 vol. % mullite, 2 vol. % cristobalite and 96 vol. % disordered clay. Thus, the result is not very sensitive to the ratio of mullite to cristobalite.

Example 15

Detailed Structure of the C/C Composite Containing the Ceramic-Carbon Hybrid Material This Example describes the detailed structure of the C/C composite containing the ceramic-carbon hybrid material. The composite is fabricated using the method described in Example 2. The ingredients are as described in Example 1.

The true density of the hybrid (2.366 g/cm$^3$) allows the conversion of the proportions of the fibers, the carbon matrix and the ceramic-carbon hybrid material from mass fractions to volume fractions. The mass fractions are 56.5 wt. % fibers, 36.2 wt. % carbon matrix and 7.3 wt. % hybrid. Hence, the C/C composite contains 50 vol. % fibers, 45 vol. % carbon matrix (or 33 vol. % carbon matrix without porosity plus 12% porosity) and 5 vol. % hybrid. If the elemental carbon in the ceramic-carbon hybrid material and the elemental carbon in the matrix (derived from the pitch) are considered together, the total elemental carbon content would amount to 46 vol. %, while the ceramic part of the ceramic-carbon hybrid material would amount to 4 vol. % of the overall composite.

Although preferred embodiments have been depicted and described in detail herein, it will be apparent to those skilled in the relevant art that various additions, substitutions, modifications and the like can be made without departing from the spirit of the invention and these are therefore considered to be within the scope of the invention as defined in the claims which follow.

What is claimed:

1. A hybrid material that exhibits strength, stiffness and ability to resist high temperatures,
    said hybrid material essentially consisting of component A and component B,
    said component A being selected from the group consisting of inorganic compounds, oxides, carbides, nitrides, borides, and combinations thereof,
    said component B being selected from the group consisting of elemental carbon, inorganic compounds, oxides, carbides, nitrides, borides, and combinations thereof,
    said component B comprising a plurality of units,
        each of said units substantially exhibiting a shape,
        said shape substantially exhibiting a long dimension and a short dimension,
        said short dimension being in a direction that is essentially perpendicular to the direction of said long dimension,
        said short dimension being in the range from 0.1 nm to 0.5 μm,
    said component A comprising a plurality of units,
        each of said units substantially exhibiting a shape,
        said shape substantially exhibiting a long dimension and a short dimension,
        said short dimension being in a direction that is essentially perpendicular to the direction of said long dimension,
        said short dimension being in the range from 0.1 nm to 50 μm,
    each of the units of component B being substantially in contact with and substantially bonded to at least one of the units of component A,
    the direction of the short dimension of each of the units of component B being essentially parallel to the direction of the short dimension of an adjoining unit of component A.

2. The hybrid material of claim 1, wherein said component A amounts to more than 60% of the volume of said hybrid material.

3. The hybrid material of claim 1, wherein said hybrid material is substantially derived from a composition comprising an organo-modified mineral,
    said organo-modified mineral essentially consisting of component I and component II, said component I being selected from the group consisting of minerals, silicate minerals, and combinations thereof,
said component II being selected from the group consisting of organic compounds, organometallic compounds, organophosphorus compounds, organosilicon compounds, organoboron compounds, organobismuth compounds, metallocenes, and combinations thereof,
said component II comprising a plurality of units,
each of said units substantially exhibiting a shape,
said shape substantially exhibiting a long dimension and a short dimension,
said short dimension being in a direction that is essentially perpendicular to the direction of said long dimension,
said short dimension being in the range from 0.1 nm to 0.5 µm,
said component I comprising a plurality of units,
each of said units substantially exhibiting a shape,
said shape substantially exhibiting a long dimension and a short dimension,
said short dimension being in a direction that is essentially perpendicular to the direction of said long dimension,
said short dimension being in the range from 0.1 nm to 50 µm,
each of the units of component II being substantially in contact with and substantially bonded to at least one of the units of component I,
the direction of the short dimension of each of the units of component II being essentially parallel to the direction of the short dimension of an adjoining unit of component I,
component B of said hybrid material being substantially derived from component II of said organo-modified mineral, and
component A of said hybrid material being substantially derived from component I of said organo-modified mineral.

4. The hybrid material of claim 1, wherein
each unit of said component B substantially exhibits the shape of a sheet, and
each unit of said component A substantially exhibits the shape of a sheet.

5. The hybrid material of claim 1, wherein
each unit of said component B substantially exhibits the shape of a fiber, and
each unit of said component A substantially exhibits the shape of a tube,
the interior of said tube being substantially filled with a unit of component B.

6. The hybrid material of claim 1, wherein said inorganic compounds are selected from the group consisting of mullite, spinel, enstatite, cristobalite, quartz, silicon dioxide, silicon carbide, hafnium carbide, silicon oxycarbide, silicon nitride, silicon oxynitride, aluminum oxide, aluminum nitride, aluminum oxynitride, boron nitride, boron carbide, silicide, titanium boride, titanium silicide, titanium carbide, titanium nitride, tungsten carbide, zirconium carbide, silicon titanium boride, hafnium silicide, borate, boron oxide, boron carbide, zinc oxide, beryllia, ceria, thoria, zirconia, hafnium oxide, yttrium oxide, titanium dioxide, bismuth telluride, bismuth selenide, bismuth compounds, lead telluride, lead selenide, zinc telluride, zinc selenide, manganese dioxide, magnesium oxide, cordierite, sekaninaite, ordered clay, disordered clay, smectite, montmorillonite, bentonite, hectorite, kaolinite, dickite, halloysite, nacrite, palygorskite, illite, chlorite, nontronite, talc, phyllosilicate, sepiolite, zeolite, sericite, mica, orthoclase, aluminum silicate, magnesium silicate, calcium silicate, and combinations thereof.

7. The hybrid material of claim 1, wherein said elemental carbon is selected from the group consisting of graphite, graphite nanoplatelet, turbostratic carbon, disordered carbon, glassy carbon, amorphous carbon, diamond, diamond-like carbon, fullerene, graphene, chemically modified graphene, chemically modified graphite, intercalated graphite, activated carbon, and combinations thereof.

8. The hybrid material of claim 1, wherein said hybrid material is substantially derived from a composition comprising an organo-modified mineral,
said organo-modified mineral essentially consisting of component I and component II,
said component I being selected from the group consisting of minerals, silicate minerals, and combinations thereof,
said component II being selected from the group consisting of organic compounds, organometallic compounds, organophosphorus compounds, organosilicon compounds, organoboron compounds, organobismuth compounds, metallocenes, and combinations thereof,
said organic compounds being selected from the group consisting of polymers, aromatic polymers, polymer blends, copolymers, thermosetting polymers, thermoplastic polymers, pre-polymers, monomers, cellulose, rayon, phenolic, epoxy, polyarylacetylene, polyimide, polyimidesiloxane, polyacrylonitrile, lignin, furfuryl resin, resins, hydrocarbons, carbonaceous molecules, quaternary compounds, quaternary ammonium salts, carbonaceous molecules, pitch, mesophase pitch, isotropic pitch, combinations thereof.

9. The hybrid material of claim 1, wherein said hybrid material is substantially derived from a composition comprising an organo-modified mineral,
said organo-modified mineral essentially consisting of component I and component II,
said component I being selected from the group consisting of minerals, silicate minerals, and combinations thereof,
said component II being selected from the group consisting of organic compounds, organometallic compounds, organophosphorus compounds, organosilicon compounds, organoboron compounds, organobismuth compounds, metallocenes, and combinations thereof,
said minerals being selected from the group consisting of ordered clay, disordered clay, smectite, montmorillonite, bentonite, hectorite, kaolinite, dickite, halloysite, nacrite, palygorskite, illite, chlorite, nontronite, phyllosilicates, sepiolite, zeolite, sericite, mica, aluminum silicate, magnesium silicate, calcium silicate, tellurobismuthite, tetradymite, telluride mineral, bismuthinite, bismutite, bismite, berryite, kobellite, and combinations thereof.

10. A composite material that exhibits strength, stiffness and ability to withstand high temperatures,
said composite material comprising a hybrid material and an additional solid ingredient,
said hybrid material essentially consisting of component A and component B,
said component A being selected from the group consisting of inorganic compounds, oxides, carbides, nitrides, borides, and combinations thereof, said component B being selected from the group consisting of elemental carbon, inorganic compounds, oxides, carbides, nitrides, borides, and combinations thereof,
said component B comprising a plurality of units, each of said units substantially exhibiting a shape,
said shape substantially exhibiting a long dimension and a short dimension,
said short dimension being in a direction that is essentially perpendicular to the direction of said long dimension,
said short dimension being in the range from 0.1 nm to 0.5 μm,
said component A comprising a plurality of units,
each of said units substantially exhibiting a shape,
said shape substantially exhibiting a long dimension and a short dimension,
the direction of said short dimension being essentially perpendicular to the direction of said long dimension,
said short dimension being in the range from 0.1 nm to 50 μm,
each of the units of component B being substantially in contact with and substantially bonded to at least one of the units of component A,
the direction of the short dimension of each of the units of component B being essentially parallel to the direction of the short dimension of an adjoining unit of component A.

11. The composite material of claim 10, wherein said component A amounts to more than 60% of the volume of said hybrid material.

12. The composite material of claim 10, wherein said hybrid material is substantially derived from a composition comprising an organo-modified mineral,
said organo-modified mineral essentially consisting of component I and component II,
said component I being selected from the group consisting of minerals, silicate minerals, and combinations thereof,
said component II being selected from the group consisting of organic compounds, organometallic compounds, organophosphorus compounds, organosilicon compounds, organoboron compounds, organobismuth compounds, metallocenes, and combinations thereof,
said component II comprising a plurality of units,
each of said units substantially exhibiting a shape,
said shape substantially exhibiting a long dimension and a short dimension,
said short dimension being in a direction that is essentially perpendicular to the direction of said long dimension,
said short dimension being in the range from 0.1 nm to 0.5 μm,
said component I comprising a plurality of units,
each of said units substantially exhibiting a shape,
said shape substantially exhibiting a long dimension and a short dimension,
said short dimension being in a direction that is essentially perpendicular to the direction of said long dimension,
said short dimension being in the range from 0.1 nm to 50 μm,
each of the units of said component II being substantially in contact with and substantially bonded to at least one of the units of component I,
the direction of the short dimension of each of the units of component II being essentially parallel to the direction of the short dimension of an adjoining unit of component I,
component B of said hybrid material being substantially derived from component II of said organo-modified mineral, and
component A of said hybrid material being substantially derived from component I of said organo-modified mineral.

13. The composite material of claim 10, wherein
each unit of said component B substantially exhibits the shape of a sheet, and
each unit of said component A substantially exhibits the shape of a sheet.

14. The composite material of claim 10, wherein
each unit of said component B substantially exhibits the shape of a fiber, and
each unit of said component A substantially exhibits the shape of a tube,
the interior of said tube being substantially filled with a unit of said component B.

15. The composite material of claim 10, wherein said additional solid ingredient is selected from the group consisting of carbon fibers, silicon carbide fibers, carbide fibers, oxycarbide fibers, silicon nitride fibers, nitride fibers, oxynitride fibers, silicon dioxide fibers, quartz fibers, glass fibers, fiberglass, aluminum oxide fibers, oxide fibers, ceramic fibers, mineral fibers, carbon nanofibers, carbon nanotubes, steel fibers, metal fibers, carbon particles, graphite particles, graphite nanoplatelets, graphene particles, diamond particles, ceramic particles, silicon carbide particles, boron nitride particles, mullite particles, zirconia particles, beryllia particles, ceria particles, silicide particles, boride particles, aluminum oxide particles, zinc oxide particles, oxide particles, metal particles, metal alloy particles, molybdenum particles, tungsten particles, and combinations thereof.

16. The composite material of claim 10, wherein said composite material comprises a carbon-carbon composite material,
said carbon-carbon composite material comprising
(a) carbon fibers in an amount ranging from 40% to 65% of the volume of said composite material,
(b) a carbon matrix in an amount ranging from 20% to 50% of the volume of said composite material, and
(c) said hybrid material in an amount ranging from 2% to 10% of the volume of said composite material.

17. A method of making a composite material that exhibits strength, stiffness and ability to resist high temperatures,
said composite material comprising a hybrid material and an additional solid ingredient,
said hybrid material functioning as a filler and a binder in said composite material,
said hybrid material essentially consisting of component A and component B,
said component A being selected from the group consisting of inorganic compounds, oxides, carbides, nitrides, borides, and combinations thereof,
said component B being selected from the group consisting of elemental carbon, inorganic compounds, oxides, carbides, nitrides, borides, and combinations thereof,
said component B comprising a plurality of units,
each of said units substantially exhibiting a shape,
said shape substantially exhibiting a long dimension and a short dimension,
said short dimension being in a direction that is essentially perpendicular to the direction of said long dimension,
said short dimension being in the range from 0.1 nm to 0.5 μm, said component A comprising a plurality of units,
  each of said units substantially exhibiting a shape,
    said shape substantially exhibiting a long dimension and a short dimension,
    said short dimension being in a direction that is essentially perpendicular to the direction of said long dimension,
    said short dimension being in the range from 0.1 nm to 50 μm,
  each of the units of component B being substantially in contact with and substantially bonded to at least one of the units of component A,
  the direction of the short dimension of each of the units of component B being essentially parallel to the direction of the short dimension of an adjoining unit of component A,
said method comprising heating a composition comprising an organo-modified mineral and said additional solid ingredient,
said heating being conducted under pressure in the essential absence of oxygen,
the temperature of said heating being in the range from 400° C. to 3000° C. and preferably in the range from 800° C. to 1500° C., and
said pressure being in the range from 1 MPa to 100 MPa and preferably in the range from 10 MPa to 30 MPa,
said organo-modified mineral essentially consisting of component I and component II,
  said component I being selected from the group consisting of minerals, silicate minerals, and combinations thereof, such that component A is formed from component I during said heating,
  said component II being selected from the group consisting of organic compounds, organometallic compounds, organophosphorus compounds, organosilicon compounds, organoboron compounds, organobismuth compounds, metallocenes, and combinations thereof, such that component B is formed from component II during said heating.

18. The method of claim 17, wherein said composition also comprises a matrix precursor, said matrix precursor contributing to forming the matrix of said composite material during said heating.

19. The method of claim 17, wherein said composition also comprises a matrix precursor, said matrix precursor contributing to forming the matrix of said composite material during said heating, said matrix precursor being selected from the group consisting of organic compounds, organometallic compounds, organophosphorus compounds, organosilicon compounds, organoboron compounds, organobismuth compounds, metallocenes, and combinations thereof.

20. The method of claim 17, wherein said additional solid ingredient is selected from the group consisting of carbon fibers, silicon carbide fibers, carbide fibers, oxycarbide fibers, silicon nitride fibers, nitride fibers, oxynitride fibers, silicon dioxide fibers, quartz fibers, glass fibers, fiberglass, aluminum oxide fibers, oxide fibers, ceramic fibers, mineral fibers, carbon nanofibers, carbon nanotubes, steel fibers, metal fibers, carbon particles, graphite particles, graphite nanoplatelets, graphene particles, diamond particles, ceramic particles, silicon carbide particles, boron nitride particles, mullite particles, zirconia particles, beryllia particles, ceria particles, silicide particles, boride particles, aluminum oxide particles, zinc oxide particles, oxide particles, metal particles, metal alloy particles, molybdenum particles, tungsten particles, and combinations thereof.

* * * * *